(12) United States Patent
Tumblin et al.

(10) Patent No.: US 12,346,430 B1
(45) Date of Patent: Jul. 1, 2025

(54) SYSTEMS AND METHODS FOR IMPLEMENTING CYBERSECURITY USING TRUST BINARIES

(71) Applicant: CSP Inc., Lowell, MA (US)

(72) Inventors: Henry Tumblin, Castine, ME (US); Gary Southwell, Leander, TX (US)

(73) Assignee: CSP Inc., Lowell, MA (US)

( * ) Notice: Subject to any disclaimer, the term of this patent is extended or adjusted under 35 U.S.C. 154(b) by 0 days.

(21) Appl. No.: 17/688,878

(22) Filed: Mar. 7, 2022

Related U.S. Application Data

(63) Continuation of application No. 17/684,363, filed on Mar. 1, 2022, now Pat. No. 11,449,602.

(51) Int. Cl.
*G06F 21/51* (2013.01)
(52) U.S. Cl.
CPC ........ *G06F 21/51* (2013.01); *G06F 2221/033* (2013.01)
(58) Field of Classification Search
CPC ............................ G06F 21/51; G06F 2221/033
See application file for complete search history.

(56) References Cited

U.S. PATENT DOCUMENTS

| | | | |
|---|---|---|---|
| 5,757,914 A | 5/1998 | McManis | |
| 5,835,594 A * | 11/1998 | Albrecht | G06F 21/79 713/187 |
| 10,977,158 B1 | 4/2021 | Chen et al. | |
| 10,979,440 B1 | 4/2021 | Kalika | |
| 10,983,958 B1 | 4/2021 | Miller et al. | |
| 10,990,678 B2 | 4/2021 | Tas et al. | |
| 11,449,602 B1 * | 9/2022 | Tumblin | G06F 21/602 |
| 11,605,076 B2 | 3/2023 | Dunjic et al. | |
| 11,734,681 B2 | 8/2023 | Gonzales, Jr. | |

(Continued)

FOREIGN PATENT DOCUMENTS

KR  10-2250779 B1  5/2021

OTHER PUBLICATIONS

Tumblin, Office Action, U.S. Appl. No. 17/684,363, May 24, 2022, 9 pgs.

(Continued)

*Primary Examiner* — Meng Li
(74) *Attorney, Agent, or Firm* — SankerIP; David V. Sanker

(57) ABSTRACT

The various implementations described herein include methods and devices for creating and using trust binaries. In one aspect, a method includes executing a trust agent and detecting, via the trust agent, upcoming execution of a program. In response to the detection, a trust binary for the program is obtained from a trust store and authenticity of the program is confirmed by comparing executable code of the program with the obtained trust binary. Execution of the program is allowed in accordance with the confirmed authenticity. The method also includes identifying upcoming execution of a function in the program by monitoring execution of the program and obtaining, from the trust binary, a function digest corresponding to the function. Authenticity of the function is confirmed by comparing executable code of the function with the obtained function digest. Execution of the function is allowed in accordance with the confirmed authenticity.

21 Claims, 16 Drawing Sheets

(56) References Cited

U.S. PATENT DOCUMENTS

| | | |
|---|---|---|
| 2002/0188849 A1* | 12/2002 | Kwan .................... G06F 21/64 713/176 |
| 2009/0254756 A1* | 10/2009 | Kawakita ............ H04L 63/0823 713/181 |
| 2010/0031308 A1 | 2/2010 | Khalid |
| 2010/0274755 A1 | 10/2010 | Stewart |
| 2010/0281260 A1* | 11/2010 | Farrugia ................ H04L 9/3236 713/170 |
| 2014/0195575 A1 | 7/2014 | Haustein et al. |
| 2015/0019856 A1* | 1/2015 | Kim ..................... G06F 21/575 713/1 |
| 2017/0046806 A1 | 2/2017 | Haldenby et al. |
| 2018/0039667 A1 | 2/2018 | Pierce et al. |
| 2018/0063159 A1 | 3/2018 | Naughton-Green et al. |
| 2018/0173871 A1* | 6/2018 | Toth .................... H04W 12/126 |
| 2018/0227119 A1 | 8/2018 | Bibera |
| 2018/0246717 A1 | 8/2018 | Martin |
| 2018/0260564 A1 | 9/2018 | Porteboeuf |
| 2018/0356236 A1 | 12/2018 | Lawrenson et al. |
| 2018/0365415 A1 | 12/2018 | Monastyrsky et al. |
| 2019/0005242 A1* | 1/2019 | Agarwal ............... G06F 21/566 |
| 2019/0013948 A1 | 1/2019 | Mercuri et al. |
| 2019/0074968 A1 | 3/2019 | Liu et al. |
| 2019/0121984 A1 | 4/2019 | Rhee et al. |
| 2020/0045075 A1 | 2/2020 | Kliger et al. |
| 2020/0210413 A1 | 7/2020 | Quick et al. |
| 2020/0243205 A1* | 7/2020 | Sharma ................ G06F 16/137 |
| 2020/0252410 A1 | 8/2020 | Casey et al. |
| 2020/0301892 A1 | 9/2020 | Florin et al. |
| 2020/0302065 A1 | 9/2020 | Lawson et al. |
| 2020/0320039 A1 | 10/2020 | Manningham et al. |
| 2020/0342129 A1 | 10/2020 | Chalken et al. |
| 2021/0012326 A1 | 1/2021 | Maxwell Zelocchi |
| 2021/0073209 A1 | 3/2021 | Loaiza et al. |
| 2021/0078512 A1 | 3/2021 | Ghannam et al. |
| 2021/0157915 A1* | 5/2021 | Pizano ................. G06F 21/563 |
| 2021/0174432 A1* | 6/2021 | Gonnaud ............. G06Q 20/401 |
| 2021/0182423 A1 | 6/2021 | Padmanabhan |
| 2021/0209483 A1 | 7/2021 | Bose et al. |
| 2021/0248598 A1 | 8/2021 | Jain et al. |
| 2021/0263927 A1 | 8/2021 | Tang et al. |
| 2021/0264539 A1 | 8/2021 | Leise et al. |
| 2021/0334375 A1 | 10/2021 | Hu et al. |
| 2021/0397710 A1 | 12/2021 | Cohen et al. |
| 2022/0012341 A1* | 1/2022 | Sarkar .................. G06F 21/562 |
| 2022/0058289 A1 | 2/2022 | Beardsworth et al. |
| 2022/0121429 A1 | 4/2022 | Haile et al. |
| 2022/0121757 A1 | 4/2022 | Winarski |
| 2022/0138315 A1* | 5/2022 | Meurant ................ H04L 63/08 726/22 |
| 2022/0174540 A1* | 6/2022 | Paczkowski .......... H04W 24/02 |
| 2022/0237290 A1* | 7/2022 | Villegas ................. G06F 21/52 |
| 2023/0088104 A1 | 3/2023 | Grant |
| 2023/0129227 A1 | 4/2023 | Karlapalem et al. |

OTHER PUBLICATIONS

Tumblin, Notice of Allowance, U.S. Appl. No. 17/684,363, Aug. 11, 2022, 7 pgs.

Tumblin, Office Action, U.S. Appl. No. 17/735,087, May 23, 2023, 9 pgs.

Tumblin, Notice of Allowance, U.S. Appl. No. 17/735,087, Jul. 13, 2023, 7 pgs.

Tumblin, Office Action, U.S. Appl. No. 17/735,101, Sep. 1, 2023, 12 pgs.

Tumblin, Notice of Allowance, U.S. Appl. No. 17/735,101, Nov. 22, 2023, 7 pgs.

CSP Inc., International Search Report and Written Opinion, PCT/US2024/037953, Sep. 10, 2024, 12 pgs.

CSP Inc., International Preliminary Report on Patentability, PCT/US2023/014301, Aug. 30, 2024, 7 pgs.

CSP Inc., International Search Report and Written Opinion, PCT/US2023/014301, Jun. 2, 2023, 9 pgs.

* cited by examiner

| Sample.exe | Header 202 | DOS Header 206 |
| | | PE Header 208 |
| | | Optional Header(s) 210 |
| | | Data Directories 212 |
| | | Sections Table 214 |
| | Sections 204 | Code 216 |
| | | Imports 218 |
| | | Data 220 |

| Sample.exe | ELF Header 252 |
| | Program Header Table 254 |
| | Sections 256 |
| | Section Header Table 258 |

Trust Store 338

| Trust Binary 340-1 | 341 | 343-1 | 343-2 | | 343-m |
|---|---|---|---|---|---|
| | Trust Binary Name | Function digest | Function digest | ••• | Function digest |

| Trust Binary 340-2 | | 349-1 | | | 349-p |
|---|---|---|---|---|---|
| | Trust Binary Name | Function digest | Function digest | ••• | Function digest |

⋮

| Trust Binary 340-n | | | | | |
|---|---|---|---|---|---|
| | Trust Binary Name | Function digest | Function digest | ••• | Function digest |

Blocklist 342

Blockchain Information 344

| | 345 | 347-1 | 347-2 | | 347-p |
|---|---|---|---|---|---|
| | Genesis block | Transaction block | Transaction block | ••• | Transaction block |

Policy Information 346

Forensic logs 348

Figure 3B

SYSTEMS AND METHODS FOR IMPLEMENTING CYBERSECURITY USING TRUST BINARIES

RELATED APPLICATIONS

This application is a continuation of U.S. application Ser. No. 17/684,363, filed Mar. 1, 2022, entitled "Systems and Methods for Generating Trust Binaries," which is incorporated by reference herein in its entirety.

TECHNICAL FIELD

The disclosed implementations relate generally to cybersecurity and more specifically to systems and methods of using trusted binaries to implement cybersecurity.

BACKGROUND

Cybersecurity, the practice of protecting systems and networks from digital attacks, is increasingly important in the digital age. Digital attacks are becoming increasingly sophisticated and conventional endpoint detection and response (EDR) solutions are losing their effectiveness. Many conventional EDR solutions are designed to detect and stop known attacks. However, there may be a significant delay (e.g., days, weeks, or months) between the time that a new attack is deployed and the time that the EDR solution is updated to detect and stop the attack. Moreover, malware has increasingly become polymorphic, meaning it continuously changes its pattern of behavior. This polymorphic nature further increases the response time of conventional EDR solutions.

SUMMARY

A zero trust (ZT) system of the present disclosure protects a computer from unknown and unauthorized code. In order for code to run, it must first be loaded into memory. As an example, the ZT system has a trust agent (e.g., an OS-specific trust agent), which monitors each program as the program is loaded into memory and validates the program's code. The validation procedure in this example uses a trust binary, which is an alternate digital version of the original code. To execute code in this example, the ZT system requires a corresponding trust binary for the code. If the trust binary is missing or doesn't correlate, then the code is not allowed to execute on the system in this example.

In accordance with some implementations, trust binaries are used by the ZT system to confirm that the executable code has not been tampered with prior to its execution. For example, a trust binary is created for an executable file (e.g., an executable program) by first identifying the code segments of the file. Next the code segments are scanned and the executable functions within each are identified. In this example, for each identified function, a function digest is created based on a starting address of the function and its static parts. The function digests for the identified functions are combined into a trust binary for the file. In this example, a trust binary name is generated by hashing a header of the file and the trust binary is added to a trust database (e.g., a trust store), indexed by the trust binary name.

In accordance with some implementations, trust binaries are used to protect all running code in memory on a protected device. For example, the ZT protection is implemented as a kernel agent (e.g., a kernel-level device driver). In this example, the kernel agent runs at Ring-0 on the protected device, whereas application code runs at Ring-3. An example ZT protection procedure includes loading the kernel agent, where the agent loads its trust binary from a trust database and verifies that the code in memory matches the trust binary (e.g., it has not been tampered with). In this example, while the agent is running it performs spot validation when code attempts to perform certain system level operations, such as file I/O operations, registry I/O operations, thread start and stop operations, and image load and unload operations. As discussed in greater detail later, additional countermeasures may also be employed to protect against a wide range of attacks. In this example, if code doesn't match the trust binary or one of the countermeasures detects an attack, then either the process is stopped and forensics captured, or the process is allowed to continue but with forensics being captured (e.g., based on a device policy).

In various circumstances, the ZT system of the present disclosure has the following advantages over conventional cybersecurity systems. First, in accordance with some implementations, the ZT system is effective against new and emerging threats as the system blocks all untrusted binary files and thus there is no vulnerability period while the threats are being identified. Second, in accordance with some implementations, the ZT system has high efficacy as there is no dependency on past trends and no false negatives when identifying untrusted binaries. Third, in accordance with some implementations, because the ZT system monitors memory, it protects against attacks that start in memory via legitimate processes and applications. Fourth, the ZT system can operate on off-network (e.g., air gapped) systems as it can maintain and validate its trust store without requiring network access.

In accordance with some implementations, a method is performed at a computing device having memory and one or more processors. The method includes: (i) obtaining executable code for a program; (ii) identifying a plurality of executable functions from the executable code; (iii) for each executable function of the plurality of executable functions, generating a respective function digest based on one or more static parts of the respective executable function; (iv) constructing a respective trust binary comprising the respective digest for each executable function of the plurality of executable functions; (v) generating a trust binary name by applying a hash function to a header of the executable code; and (vi) indexing the trust binary in a trust database utilizing the trust binary name.

In accordance with some implementations, a method is performed at a computing device having memory and one or more processors. The method includes: (i) executing a trust agent; (ii) detecting, via the trust agent, upcoming execution of a program on the computing device; (iii) in response to the detection, obtaining a trust binary for the program from a trust store in the memory; (iv) confirming authenticity of the program by comparing executable code of the program with the obtained trust binary for the program; (v) allowing execution of the program in accordance with the confirmed authenticity of the program; (vi) identifying upcoming execution of an executable function in the program by monitoring execution of the program; (vii) in response to identifying the upcoming execution of the executable function, obtaining, from the trust binary, a function digest corresponding to the executable function; (viii) confirming authenticity of the executable function by comparing executable code of the executable function with the obtained function digest; and (ix) allowing execution of the executable function in accordance with the confirmed authenticity of the executable function.

In accordance with some implementations, a computer-readable storage medium includes a trust database storing a plurality of trust binaries, each trust binary corresponding to a respective executable program. Each trust binary of the plurality of trust binaries includes: (i) a respective trust binary name generated by applying a hash function to a respective header of a respective executable program; and (ii) a respective function digest for each executable function identified in the respective executable program, wherein the respective function digest is generated based on a respective starting address and one or more respective static parts of the respective executable function. The plurality of trust binaries are indexed in the trust database using their respective trust binary names.

In accordance with some implementations, a method is performed at a computing device having memory and one or more processors. The method includes: (i) accessing a trust store for the computing device, including obtaining a blockchain for the trust store; (ii) identifying a first change to the trust store; (iii) in response to identifying the first change, generating a first block and inserting the first block into the blockchain, where the first block includes a first encrypted digest for the first change; (iv) identifying a second change to the trust store; and (v) in response to identifying the second change, generating a second block and inserting the second block into the blockchain, where the second block includes a second encrypted digest for the second change and the first encrypted digest.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus, methods and systems are disclosed for creating and using trust binaries and blockchains for cybersecurity. Such methods and systems may complement or replace conventional methods and systems of cybersecurity.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 2A-2B illustrate example executable files in accordance with some implementations.

FIG. 3B is a block diagram of an example trust store in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

A zero trust (ZT) system of the present disclosure allows known good operating systems and application processes to execute in memory and prevents anything else from running. In accordance with some implementations, the zero trust system includes a trust agent installed at a computing device (also sometimes called an endpoint). The trust agent monitors and intercepts memory operations. The trust agent validates applications, processes, and functions before allowing them to run. Invalid applications, processes, and functions are blocked or monitored by the trust agent (e.g., depending on a security policy for the computing device). In some implementations, the ZT system utilizes a blockchain proof-of-identity scheme to validate its store of known good binaries and functions. The ZT system may compliment or replace conventional endpoint detection and response (EDR) solutions that handle known bad operating systems and application processes.

Figure 1:
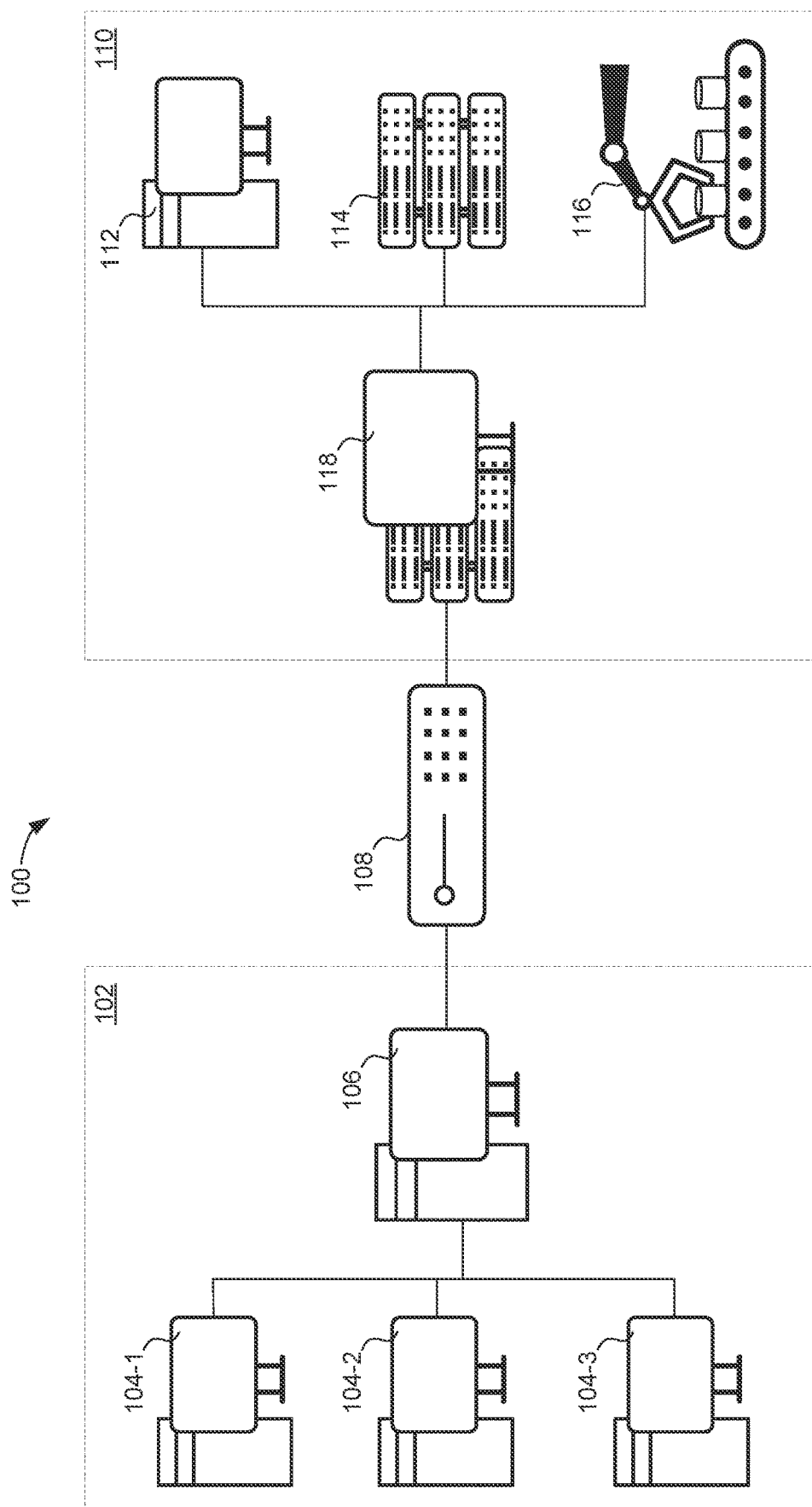
FIG. 1 illustrates an example network architecture in accordance with some implementations.

FIG. 1 illustrates a network architecture 100 in accordance with some implementations. The network architecture 100 includes an information technology (IT) portion 102 and an operational technology (OT) portion 110 communicatively coupled via a gateway device 108. The IT portion 102 includes user devices 104 (104-1, 104-2, and 104-3) and a hub device 106. In some implementations, each user device 104 includes a trust agent. In some implementations, the hub device 106 includes a trust store or trust center. In some implementations, the hub device 106 includes administrative software to manage trust binaries and/or trust policies of the user devices 104. The OT portion 110 includes a supervisory terminal 118, a user terminal 112, a server 114, and equipment 116. In some implementations, the supervisory terminal 118, the user terminal 112, the server 114, and the equipment 116 each include a trust agent. In some implementations, the supervisory terminal 118 includes software to manage trust binaries and/or trust policies of the user terminal 112, the server 114, and the equipment 116. In some implementations, the gateway device 108 provides a demilitarized zone (DMZ) between the IT portion 102 and the OT portion 110. In some implementations, the gateway device 108 includes a trust center or trust store for the IT portion 102 and/or the OT portion 110. In some implementations, the gateway device 108 provides network access to an application store for the IT portion 102 and/or the OT portion 110. In some implementations, the network architecture 100 implements a Purdue Enterprise Reference Architecture (PERA) model. In reference to the PERA model, the IT portion 102 represents levels four and five, the gateway device 108 represents level three, and the OT portion 110 represents levels zero, one, and two.

FIGS. 2A-2B illustrate example executable files in accordance with some implementations. FIG. 2A shows a program executable (PE) file 200 in accordance with some implementations. The PE file 200 includes a header portion 202 and sections portion 204. The header portion 202 includes a disk operating system (DOS) header 206 and a PE header 208. The header portion 202 also includes one or more optional headers 210, data directories 212, and a sections table 214. The data directories 212 include pointers to extra structures (e.g., imports, exports, and the like) in accordance with some implementations. The sections table 214 defines how the file is loaded into memory in accordance with some implementations. The sections portion 204 includes code 216, imports 218, and data 220. The imports 218 include links between the PE file 200 and operating system (OS) libraries. The data 220 includes information used by the code 216 in accordance with some implementations. FIG. 2B shows an executable and linkable format (ELF) file 250 in accordance with some implementations. The ELF file 250 includes an ELF header 252, a program header table 254, sections 256, and a section header table 258.

Figure 3A:
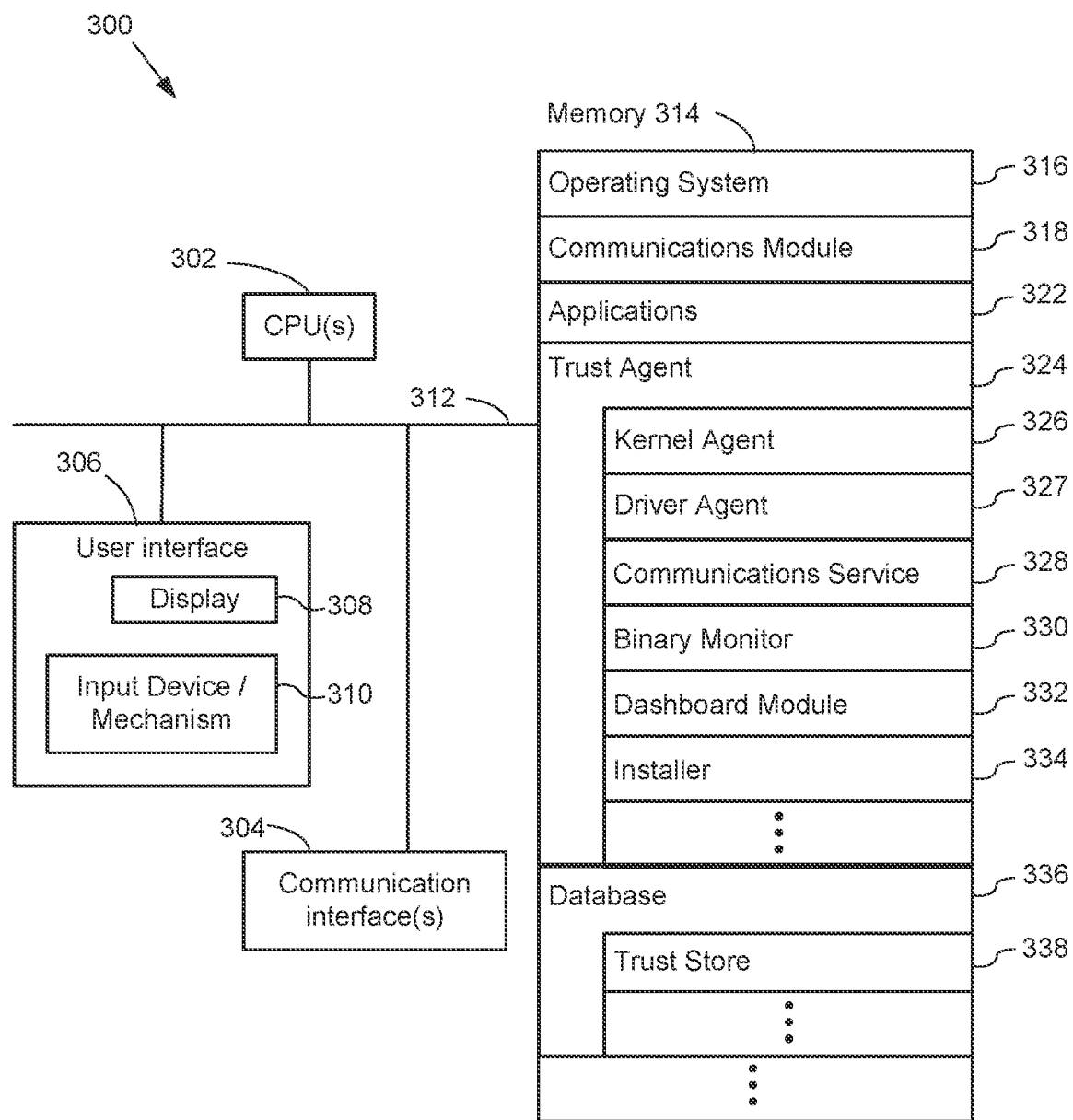
FIG. 3A is a block diagram of an example computing device in accordance with some implementations.

FIG. 3A is a block diagram of a computing device 300 in accordance with some implementations. Various examples of the computing device 300 include a desktop computer, a laptop computer, a tablet computer, and other computing devices (e.g., IT or OT devices) that have a processor capable of running a trust agent 324. The computing device 300 typically includes one or more processing units/cores (CPUs) 302 for executing modules, programs, and/or instructions stored in the memory 314 and thereby performing processing operations; one or more network or other communications interfaces 304; memory 314; and one or more communication buses 312 for interconnecting these components. The communication buses 312 may include circuitry that interconnects and controls communications between system components.

The computing device 300 optionally includes a user interface 306 comprising a display device 308 and one or more input devices or mechanisms 310. In some implementations, the input device/mechanism includes a keyboard. In some implementations, the input device/mechanism includes a "soft" keyboard, which is displayed as needed on the display device 308, enabling a user to "press keys" that appear on the display 308. In some implementations, the display 308 and input device/mechanism 310 comprise a touch screen display (also called a touch sensitive display).

In some implementations, the memory 314 includes high-speed random-access memory, such as DRAM, SRAM, DDR RAM or other random-access solid-state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer-readable storage medium. In some implementations, the memory 314, or the computer-readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the computing device 300 to other computers and devices via the one or more communication network interfaces 304 (wired or wireless) and one or more communication networks, such as the Internet, other wide area networks, local area networks, metropolitan area networks, and so on;
- applications 322 (e.g., running at Ring-3), which perform particular tasks or sets of tasks for a user (e.g., word processors, media players, web browsers, and communication platforms);
- a trust agent 324, which protects the computing device 300 by validating executing code and monitoring system level operations, such as file I/O, registry I/O, thread start/stop, image loading/unloading, etc. The trust agent 324 includes one or more of:
  - a kernel agent 326 (e.g., a kernel-level device driver that runs at Ring-0), which monitors applications in memory and verifies application binaries and function digests;
  - a driver agent 327 (e.g., a kernel thread), which monitors active device drivers and applies countermeasures. In some implementations, the driver agent 327 verifies drivers and driver functions using trust binaries for the drivers and driver functions;
  - a communications service 328 (e.g., a user-mode privileged process), which handles intra-communication of the trust agent (e.g., between the kernel agent 326, the binary monitor 330, and the dashboard module 332) and communication between the trust agent 324 and the trust store 338 and/or a trust center. In some implementations, the communications service 328 sends alerts and forensic data to a trust center and receives updates from the trust center. In some implementations, the communications service 328 checks for (e.g., requests) policy and/or software updates on a periodic basis (e.g., every 30 seconds, 30 minutes, or daily);
  - a binary monitor 330, which provides static (e.g., non-runtime) file validations, including validating newly installed applications and changed/updated applications. In some implementations, the binary monitor 330 generates (provisional) trust binaries and requests binary validation checks from the trust center;
  - a dashboard module 332, which provides a user interface for presenting alerts and allows for viewing/editing policy and/or trust binary information; and
  - an installer 334, which identifies executable files, installs trust agent components, and requests trust binaries from trust center(s). In some implementations, the installer 334 is only obtainable from a trust center. In some implementations, the installer 334 is available for download from the trust center via a web browser. In some implementations, the installer 334 customizes installation of the trust agent components (e.g., based on device type, operating system, and administrator settings); and
- one or more databases 336, which are used by the applications 322 and/or the trust agent 324. The one or more databases 336 including a trust store 338 described in more detail below with reference to FIG. 3B.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above (e.g., the trust agent 324 does not include the dashboard module 332). Furthermore, the memory 314 may store additional modules or data structures not described above (e.g., the trust agent 324 further includes a policy module).

Although FIG. 3A shows a computing device 300, FIG. 3A is intended more as a functional description of the various features that may be present rather than as a structural schematic of the implementations described herein. In practice, and as recognized by those of ordinary skill in the art, items shown separately could be combined and some items could be separated.

FIG. 3B is a block diagram of the trust store 338 in accordance with some implementations. In some implementations, the trust store 338 is a relational database (e.g., a structured query language (SQL) database). The trust store 338 includes a plurality of trust binaries 340, including trust binaries 340-1, 340-2, and 340-n. In the example of FIG. 3B, each trust binary includes a respective trust binary name and a respective plurality of function digests. For example, the trust binary 340-1 includes a trust binary name 341 and function digests 343-1 through 343-m. In some implementations, each trust binary corresponds to an executable file (e.g., an application 322) on the computing device 300. For example, the trust binary 340-1 corresponds to a first application that has 'm' functions, accordingly the trust binary 340-1 has 'm' function digests. In some implementations, at least one trust binary 340 corresponds to a device driver. For example, the trust binary 340-2 corresponds to a first device driver that has 'p' driver functions, accordingly the trust binary 340-2 has 'p' function digests. The trust store 338 further includes a blocklist 342, blockchain information 344, policy information 346, and one or more forensic logs 348. In some implementations, the blocklist 342 includes a list of blocked (corrupt, malicious) files and/or applications. The blockchain information 344 includes a genesis block 345 and a plurality of transaction blocks 347 (e.g., the transaction blocks 347-1, 347-2, and 347-p). In some implementations, the blockchain information 344 includes a respective transaction block 347 for each change to the trust store 338 (e.g., policy update, trust binary addition, etc.). More details of the blockchain information 344 are described below with respect to FIG. 3C.

In some implementations, the policy information 346 includes information on which features of the trust agent 324 are to be active, such as policies for which countermeasures to apply (and how), which notifications to present (and how), which remedial actions to apply for untrusted binaries, and the like. In some implementations, the policy information 346 includes a client certificate and an encryption key for the trust store 338. In some implementations, a program without a corresponding trust binary is considered to be untrusted. In some implementations, the policy information 346 includes a policy for responding to untrusted applications, scripts, programs, and functions. In some implementations, a policy includes whether to block, notify, or ignore each instance of untrusted behavior. In some implementations, the policy information 346 includes specific settings (e.g., exceptions) for particular programs or applications (e.g., identified by a program name or header).

In some implementations, the forensic logs 348 include information gathered in response to threats detected by the trust agent 324, such as execution of untrusted executables and/or functions. In some implementations, the information stored in the forensic logs 348 is based on an active security policy for the trust agent 324. In some implementations, the forensic logs 348 include information on one or more of: the contents of a read buffer, injected memory, an untrusted function, an untrusted script, an untrusted shellcode, modified code, and the like. In some implementations, the forensic information for a detected untrusted execution depends on the type of execution. For example, forensic information for an instance of unknown read buffering may include capture of the contents of the read buffer. As another example, forensic information for an instance of reflective injection may capture the injection information. In some implementations, the forensic logs 348 include information about the computing device (e.g., information about the operating system, version, patch level, hardware, and memory).

Figure 3C:
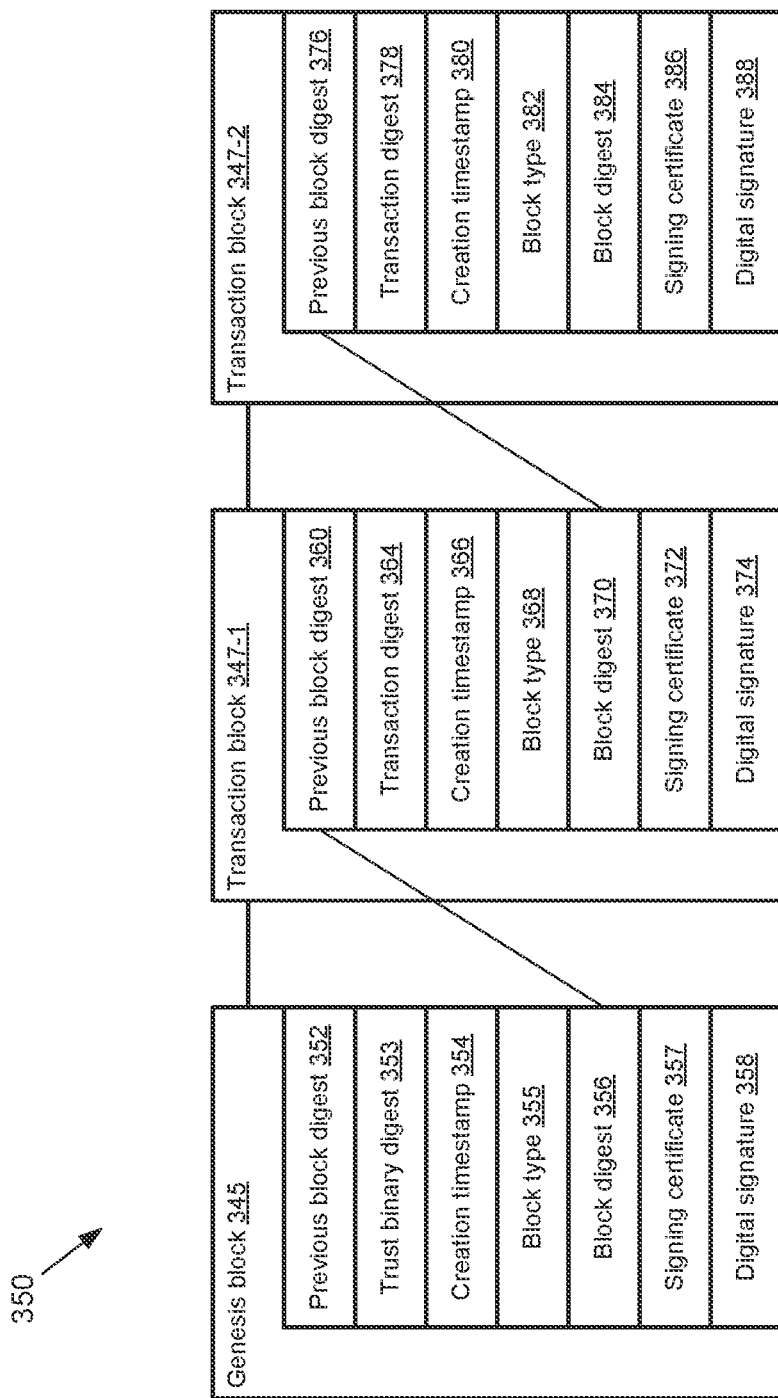
FIG. 3C is a block diagram of an example blockchain in accordance with some implementations.

FIG. 3C is a block diagram of a blockchain 350 in accordance with some implementations. In some implementations, the blockchain information 344 includes the blockchain 350. The blockchain 350 includes the genesis block 345, the transaction block 347-1, and the transaction block 347-2. The genesis block 345 includes a previous block digest 352 (e.g., an empty or blank digest), a trust binary digest 353, a creation timestamp 354, a block type 355, a block digest 356, a signing certificate 357, and a digital signature 358. In some implementations, the trust binary digest 353 includes a digest for each trust binary 340 in the trust store 338. In some implementations, the trust binary digest 353 is a secure hash algorithm (SHA) digest (e.g., an SHA-256 digest). In some implementations, the block type 355 of the genesis block 345 is a trust binary block type (e.g., because the genesis block includes the trust binary digest 353). In some implementations, the block digest 356 is an SHA digest. In some implementations, the block digest 356 is generated by applying an SHA hash function multiple times (e.g., applying an SHA-256 hash function twice). In some implementations, the signing certificate 357 includes information about the block creator for the genesis block 345 (e.g., a trust center certificate). In some implementations, the digital signature 358 corresponds to an encryption key of the trust store.

In some implementations, the transaction block 347-1 represents a first change to the trust store 338. The transaction block 347-1 includes a previous block digest 360 (corresponding to the block digest 356 for the genesis block 345), a transaction digest 364 for the first change, a creation timestamp 366, a block type 368, a block digest 370, a signing certificate 372, and a digital signature 374. In some implementations, the first change is a trust binary change (e.g., addition of a new trust binary) and the block type 368 is a trust binary block type. In some implementations, the first change is a policy update, and the block type 368 is a policy block type. In some implementations, the signing certificate 372 is a client certificate for the computing device 300. In some implementations, the digital signature 374 corresponds to an encryption key of the client device.

In some implementations, the transaction block 347-2 represents a second change to the trust store 338. The transaction block 347-2 includes a previous block digest 376 (corresponding to the digest 370 for the transaction block 347-1), a transaction digest 378 for the second change, a creation timestamp 380, a block type 382, a block digest 384, a signing certificate 386, and a digital signature 388.

In some implementations, the trust agent 324 utilizes the blockchain information 344 to validate the trust store 338. In some implementations, the blockchain 350 is validated using a proof-of-identity operation. The transaction block 347-1 includes a previous block digest 360 that should match the block digest 356 of the genesis block 345 and the transaction block 347-2 includes a previous block digest 376 that should match the block digest 370 of the transaction block 347-1. In this way, validity of the blockchain 350 can be checked by comparing the block digest of each block with the previous block digest of the next block in the chain.

In some circumstances, the blockchain 350 is advantageous over conventional cybersecurity systems because it allows for validation of the trust store 338 without requiring a network connection (e.g., operates on air-gapped systems). In some circumstances and implementations, the use of the blockchain 350 for validation of the trust store allows for the validation procedure to be decentralized and secure. In some implementations, the trust store 338 and blockchain 350 is verified at time of deployment (e.g., when installed on a new computing system) and verified on each subsequent reload of the trust agent 324.

Figure 4A:
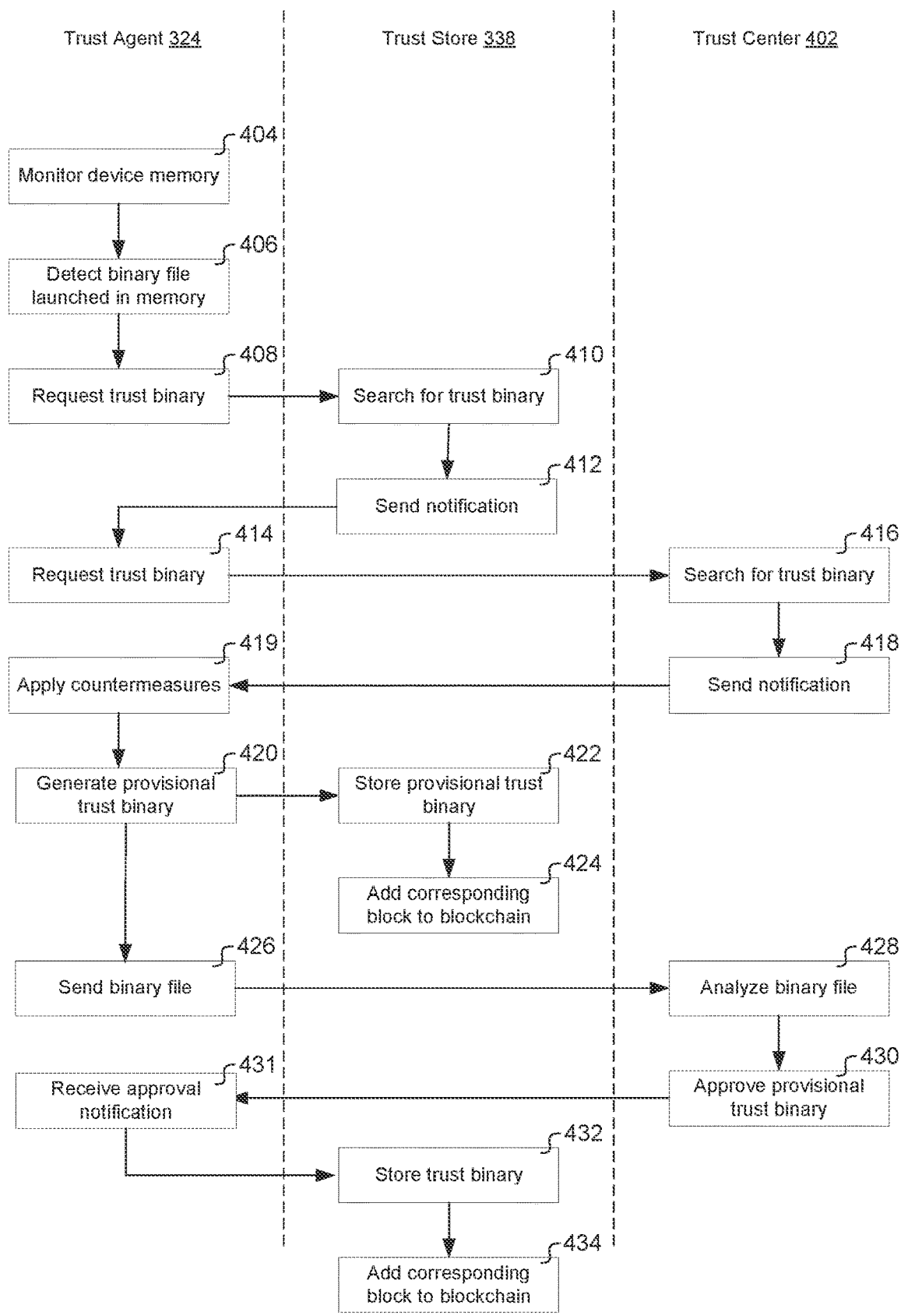
FIGS. 4A-4B illustrate example trust binary use cases in accordance with some implementations.
Figure 4B:
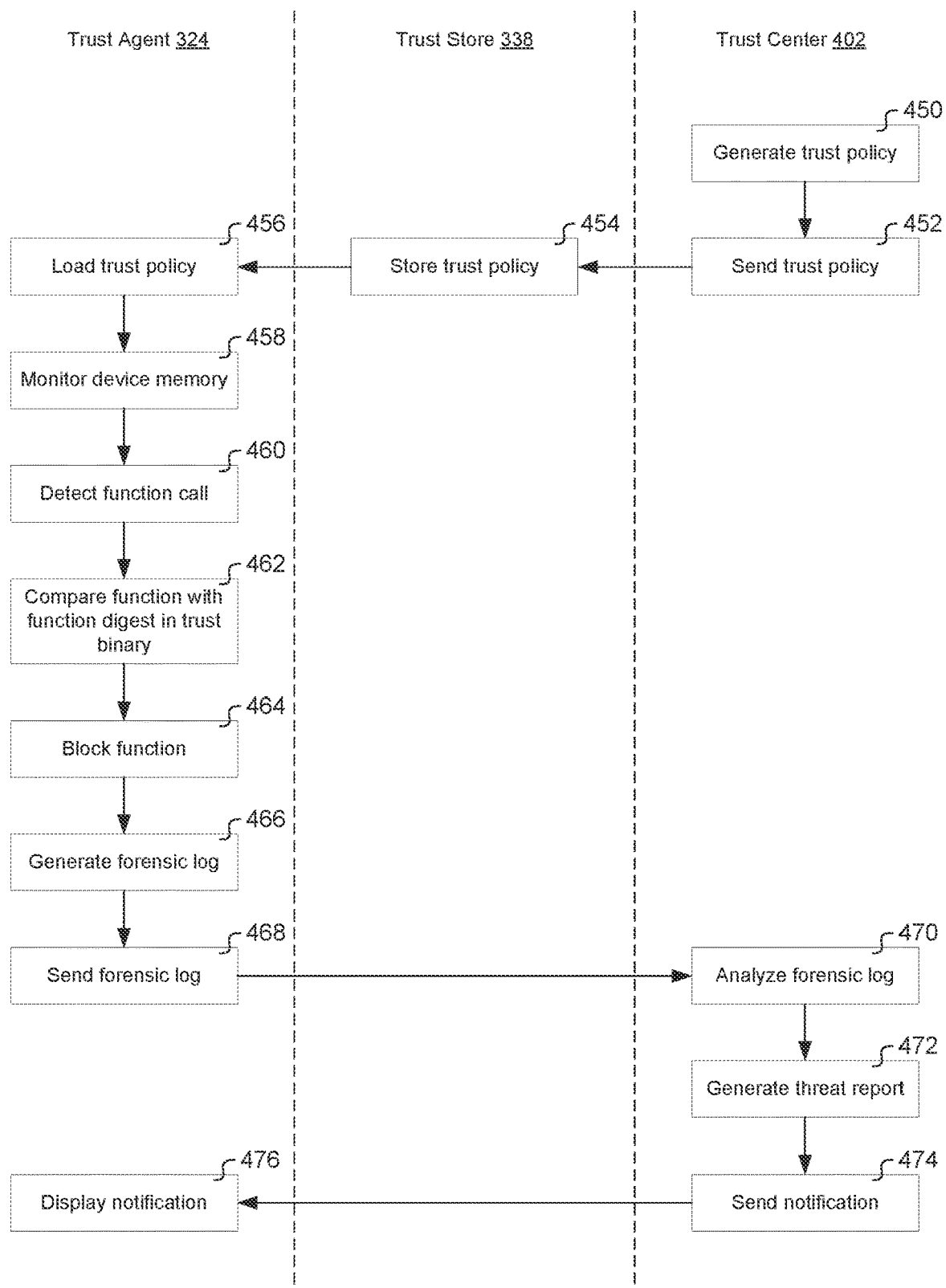

FIGS. 4A-4B illustrate example trust binary use cases in accordance with some implementations. FIG. 4A shows an example communication sequence between the trust agent 324, the trust store 338, and a trust center 402. In the example of FIG. 4A, the trust agent 324 monitors (404) the device memory (e.g., the memory 314 of the computing device 300). The trust agent 324 detects (406) a binary file launched in the memory (e.g., a binary file corresponding to an application 322). In response, the trust agent 324 requests (408) a trust binary for the binary file from the trust store 338. The trust store 338 is searched (410) (e.g., searched by a component of the trust agent 324) for a corresponding trust binary. In the example of FIG. 4A a corresponding trust binary is not found in the trust store 338. The trust agent 324 is notified (412) of the lack of a corresponding trust binary. Accordingly, the trust agent 324 requests (414) a corresponding trust binary from the trust center 402. The trust center 402 searches (416) for the corresponding trust binary. In the example of FIG. 4A, a corresponding trust binary is not found in the trust center 402. The trust center 402 sends (418) a notification to the trust agent 324 about the lack of corresponding trust binary. In response, the trust agent 324 applies (414) countermeasures (e.g., in accordance with an active policy). In the example of FIG. 4A, the trust agent 324 generates (420) a provisional trust binary (also sometimes called a local trust binary). The provisional trust binary is stored (422) in the trust store 338. A block corresponding to the provisional trust binary is created and added (424) to the blockchain (e.g., the blockchain 350). The trust agent 324 sends (426) the binary file to the trust center 402 for verification. The trust center 402 analyzes (428) the binary file. In the example of FIG. 4A, the binary file is approved (430) by the trust center 402 and the trust agent 324 is notified (431). The provisional trust binary is stored (432) in the trust store 338 as a non-provisional (standard) trust binary. A block is added (434) to the blockchain for the conversion of the provisional trust binary to a non-provisional trust binary.

FIG. 4B shows another example communication sequence between the trust agent 324, the trust store 338, and the trust center 402. In the example of FIG. 4B, the trust center 402 generates (450) a trust policy. In some implementations, the trust policy dictates how the trust agent responds to untrusted binaries and functions. In some implementations, the trust policy dictates which countermeasures should be active on the computing device. The trust policy is sent (452) to the trust store 338 (e.g., via the communications service 328). The trust policy is stored (454) in the trust store 338. The trust agent 324 loads (456) the trust policy (e.g., as part of a start-up procedure). The trust agent 324 monitors (458) the device memory (e.g., the memory 314 of the computing device 300). The trust agent 324 detects (460) a function call (e.g., a function call performed by an application 322). In response to the function call, the trust agent compares (462) the function with a function digest in a trust binary (e.g., a corresponding function digest in a trust binary for the application). In the example of FIG. 4B, the comparison indicates that the function is untrusted (e.g., has been modified). In accordance with the trust policy, the trust agent 324 blocks (464) the function from executing and generates (466) a forensic log with information related to the function and the function call. The trust agent 324 sends (468) the forensic log to the trust center 402 for analysis. The trust center 402 analyzes (470) the forensic log and generates (72) a threat report. The trust center 402 sends (474) a notification (e.g., with at least a portion of the threat report) to the trust agent 324. The trust agent 324 displays (476) the notification to a user of the device (e.g., displays the notification using the dashboard module 332).

Figure 5:
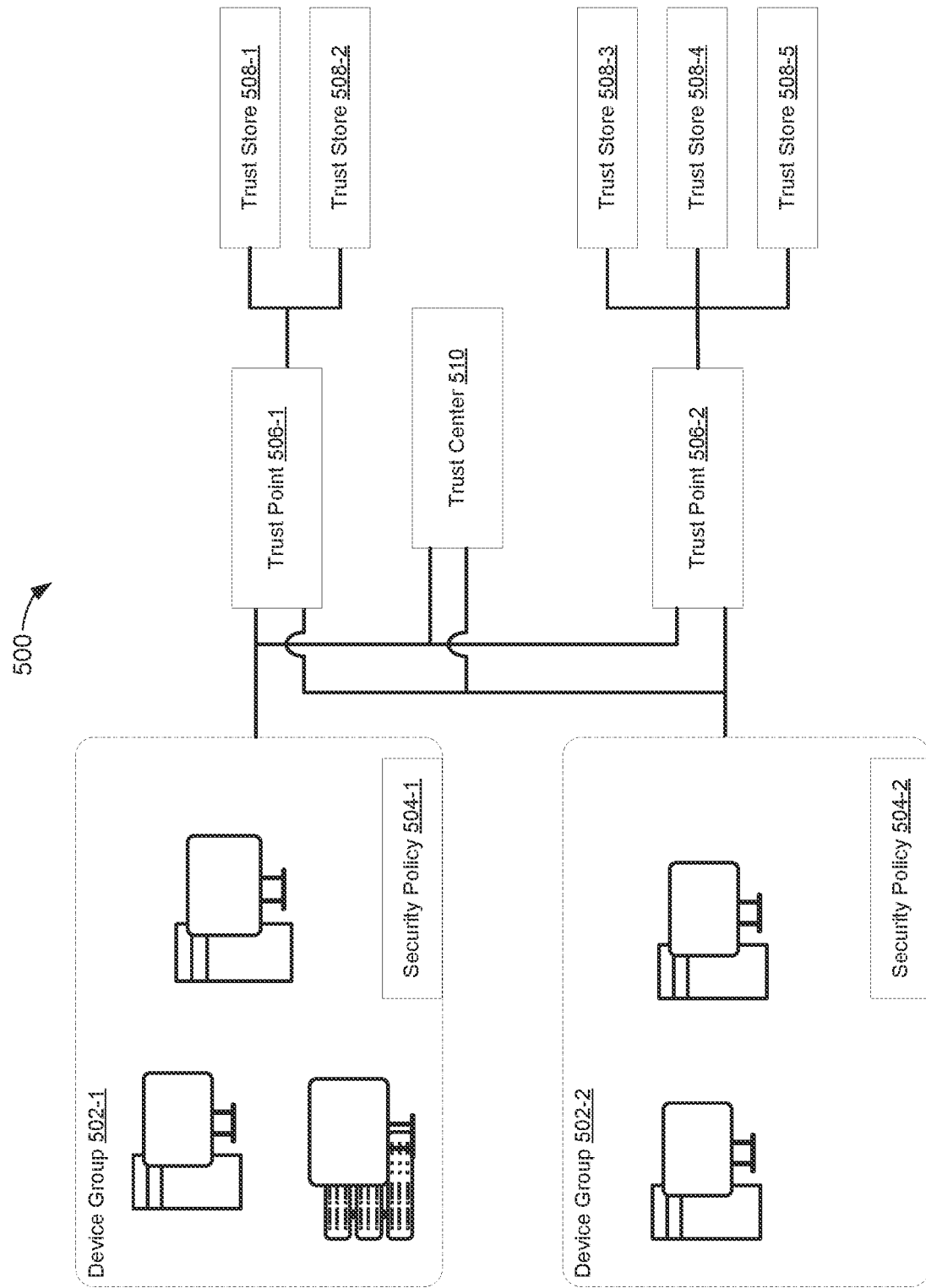
FIG. 5 illustrates an example network architecture in accordance with some implementations.

FIG. 5 illustrates a network architecture 500 in accordance with some implementations. The network architecture 500 includes the device group 502-1 and the device group 502-2. In the example of FIG. 5, the device group 502-1 includes three devices (e.g., two user terminals 112 and one supervisory terminal 118) and the device group 502-2 includes two devices (e.g., two user devices 104). The group 502-1 has an associated security policy 504-1 and the group 502-2 has an associated security policy 504-2. Thus, in this example, the same security policy (e.g., security policy 504-1) is applied to each device in the device group 502-1. The network architecture 500 further includes a trust center 510, trust points 506-1 and 506-2, and trust stores 508-1 through 508-5. In some implementations, the trust center 510 is an instance of the trust center 402. The trust points 506 represent logical groupings of trust stores in accordance with some implementations. In some implementations, the trust points 506 include search lists (indices) of connected trust stores 508. For example, the trust point 506-1 includes a search list for trust stores 508-1 and 508-2. As shown in FIG. 5, the devices within the respective device groups utilize shared trust stores 508. Specifically, each of the device group 502-1 and the device group 502-2 are coupled to the trust stores 508 via the trust points 506. In some implementations, the trust stores 508 are stored remote from the device groups 502 (e.g., on a separate network device, a network server, and/or on a separate network). In some implementations, each trust store 508 corresponds to a particular operating system, device type, or entity (e.g., and only includes trust binaries related to that operating system, device type, or entity). In some implementations, a trust store 508 includes metadata about the trust binaries stored therein (e.g., metadata bout vendor, version, date, and the like).

In some implementations, the security policies 504 each represent a policy group. In some implementations, policy settings not specified in the policy group are not applied to the device groups 502. In some implementations, each security policy 504 includes policy settings for each countermeasure (e.g., an enforce, notify, or off setting). In some implementations, a countermeasure not included in the policy settings is set to a default value (e.g., set to off). In some implementations, the security policies 504 include one or more named exceptions (e.g., different settings for a specific application). In some implementations, the security policies 504 include a dashboard setting to enable or disable use of the dashboard module 332 on a device. In some implementations, the security policies 504 include one or more blacklists (e.g., specifying applications to be prevented from running). In some implementations, the security policies 504 include restrictions for one or more applications (e.g., to prevent the one or more applications from executing on the device or device group 502). In some implementations, the security policies 504 include a list of one or more blacklist IP address and/or a list of one or more restricted IP addresses. In some implementations, the security policies 504 include an application update setting regarding whether to allow an application to update to a newer version and whether to generate a local trust binary for the updated application. In some implementations, the security policies 504 include an application install setting regarding whether to allow a new application to be installed and whether to generate a local trust binary for the new application. In some implementations, the security policies 504 includes configuration settings for devices (e.g., based on device type and/or operating system).

In some implementations, the trust center 510 includes one or more of: a policy manager, an alert manager, a trust database, a trust manager, and a dashboard manager. In some implementations, the trust center 510 is in communication with one or more other trust centers. In some implementations, the trust center 510 shares information from its trust stores with other trust centers (e.g., to accelerate deployment and provide global compliance). In some implementations, the trust center includes a web-based dashboard. In some implementations, the dashboard is a controlled-access dashboard (e.g., that uses multi-factor authentication). In some implementations, the dashboard provides an interface for management of one or more of: device groups, security policies, trust binaries, trust stores, and trust points. In some implementations, the dashboard provides an interface for inventory of endpoints (e.g., computing devices with trust agents). In some implementations, the dashboard provides an interface for display and management of one or more of: notifications (alerts), whitelists, risk assessments, authentication management, and communication configurations (e.g., peer-to-peer networking). In some implementations, the policy manager sets policy groups (e.g., to be attached to corresponding device groups 502) and individual policy settings.

In some implementations, the trust center 510 provides policy and updates for endpoint devices (e.g., the devices in the device groups 502). In some implementations, the trust center 510 records alerts and forensic data received from the device groups 502. In some implementations, the trust center 510 provides validation of applications and programs and creates corresponding trust binaries (e.g., to be distributed to the trust stores 508). In some implementations, the trust center 510 provides organizational management of the trust binaries (e.g., determines which trust stores 508 receive and store which trust binaries). In some implementations, the trust center 510 operates at a network gateway or server system. In some implementations, the trust center 510 operates at a virtual machine on a server system or gateway device.

In some implementations, the trust center 510 validates a trust binary by determining one or more of: (i) whether the application was obtained directly from a manufacturer, (ii) whether the application is signed, the signature is valid, the signing certificates are valid, and the chain of trust is valid, (iii) whether a digest of the application is cleared by a virus scanner and/or blacklist checker, (iv) whether the application (or update to the application) was obtained from a trusted download site, (v) whether a site administrator approved the application for use, and (vi) whether a user has approved the application for local use at the computing system.

In some implementations, the trust center 510 provides administrator functions for one or more trust stores and/or trust points. In some implementations, the administrator functions include a function to create, duplicate, or delete a trust store or trust point. In some implementations, the administrator functions include a function to move trust stores, trust points, and/or trust binaries between devices and systems.

Figure 6A:
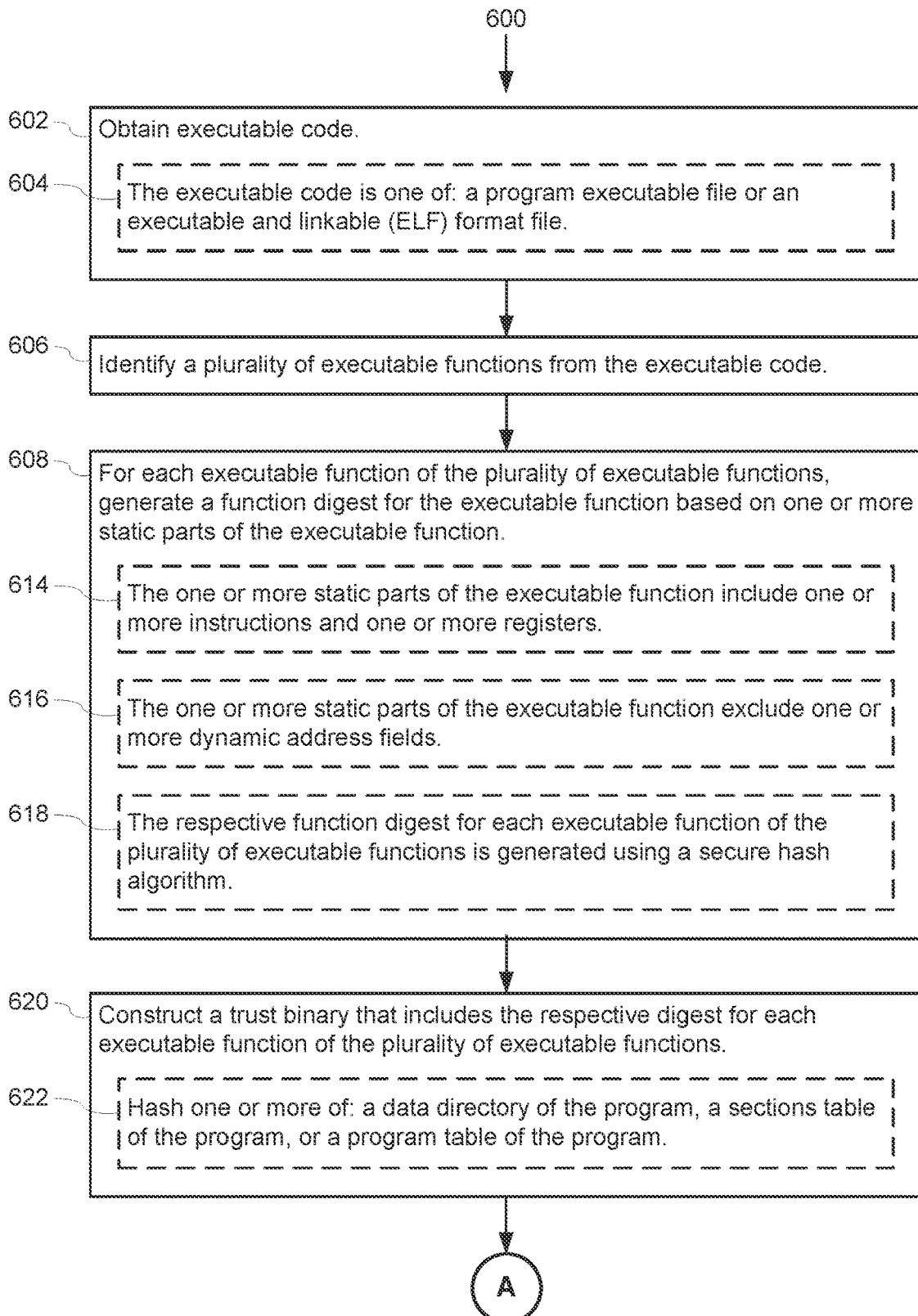
FIGS. 6A-6B provide a flowchart of an example process for creating trust binaries in accordance with some implementations.
Figure 6B:
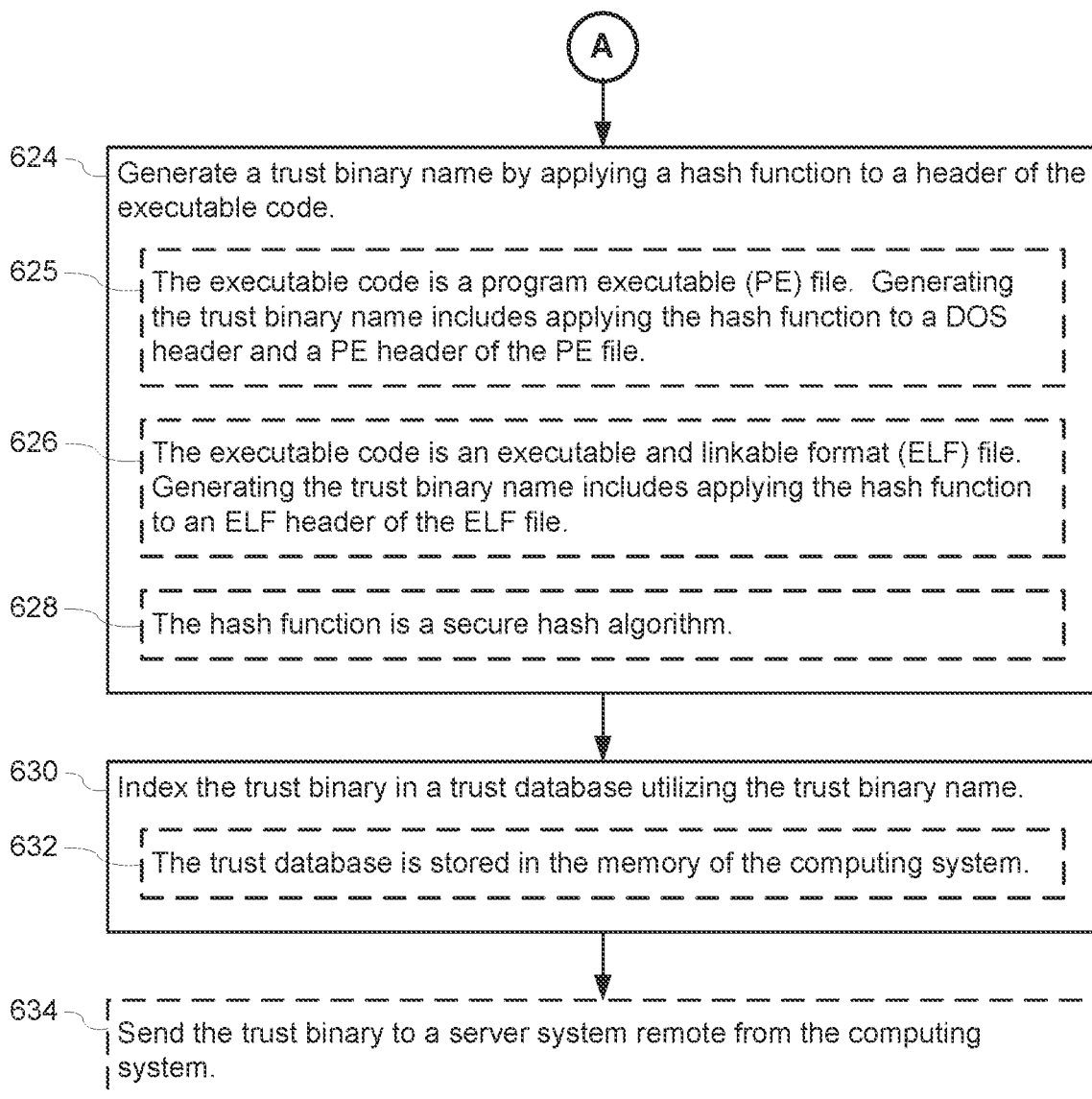
Figure 7A:
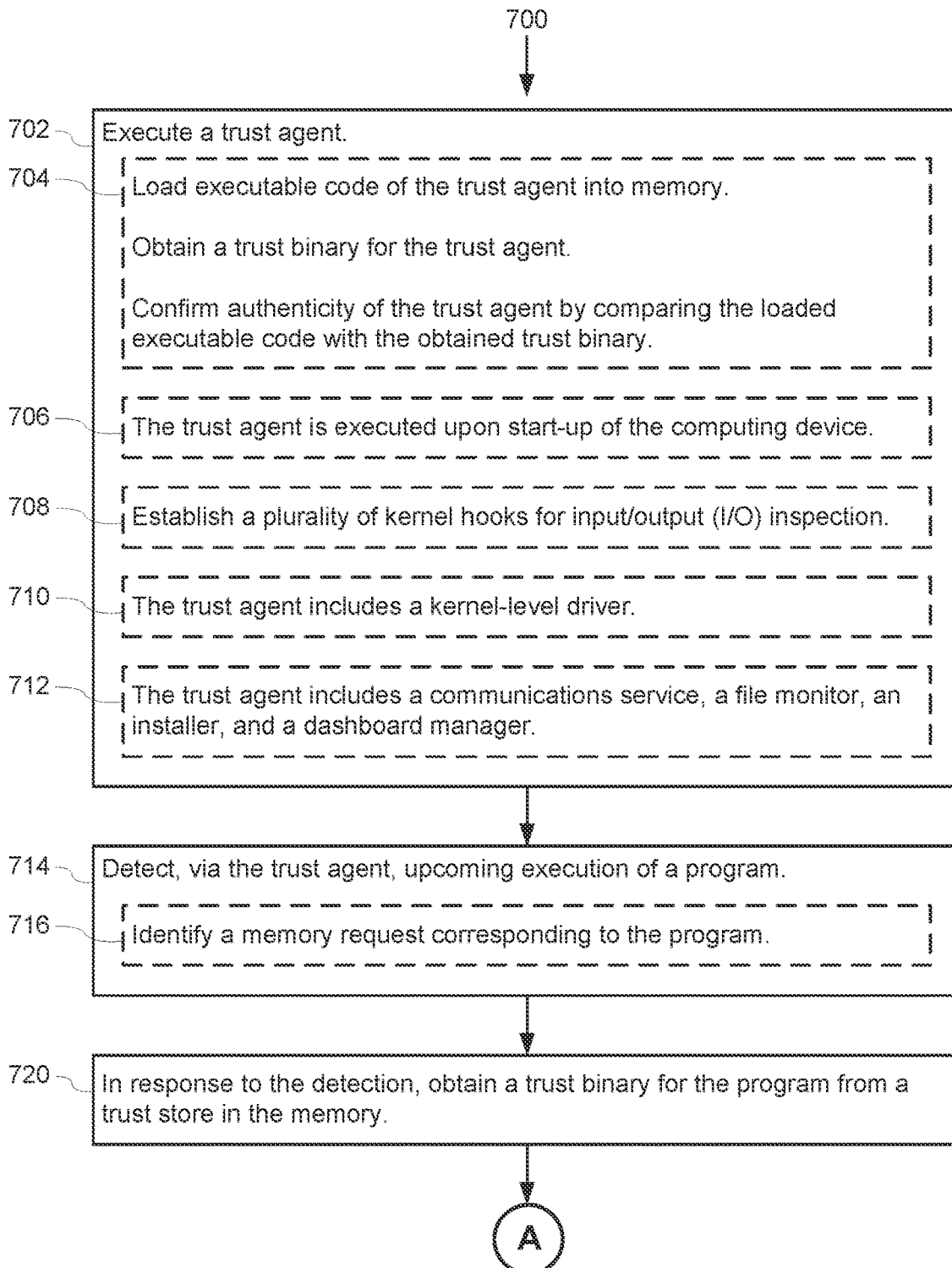
FIGS. 7A-7D provide a flowchart of an example process for using trust binaries in accordance with some implementations.
Figure 7B:
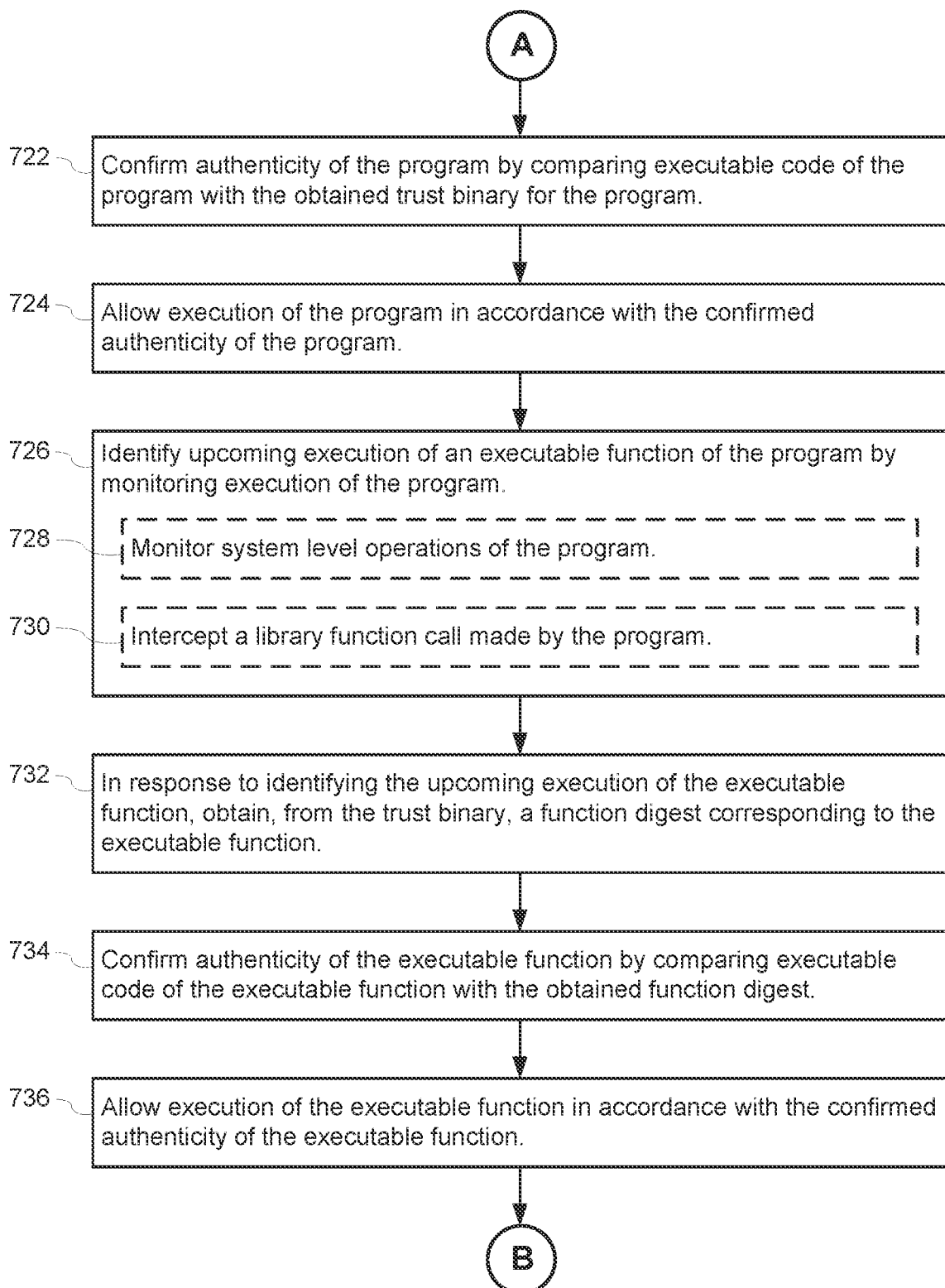
Figure 7C:
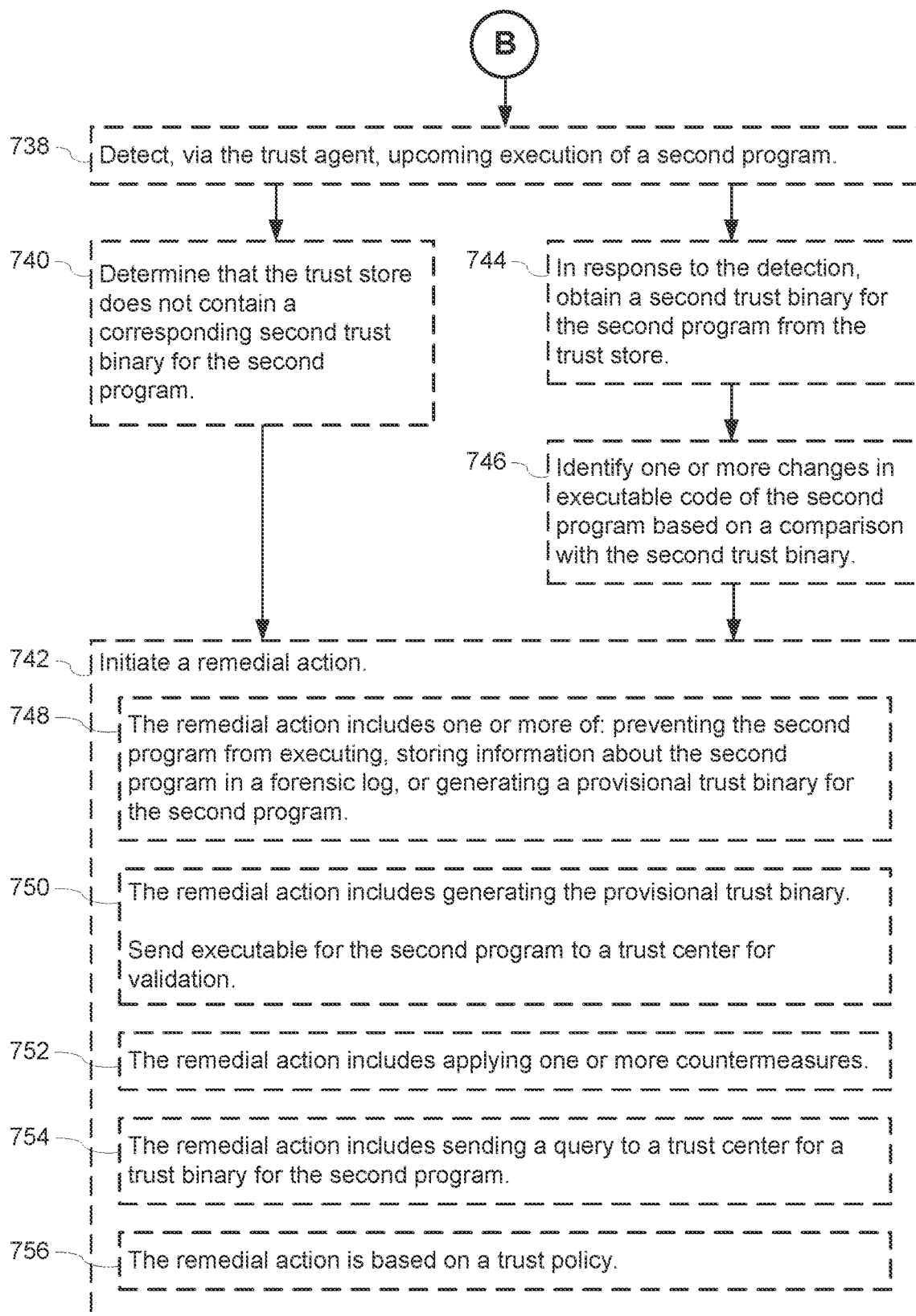
Figure 7D:
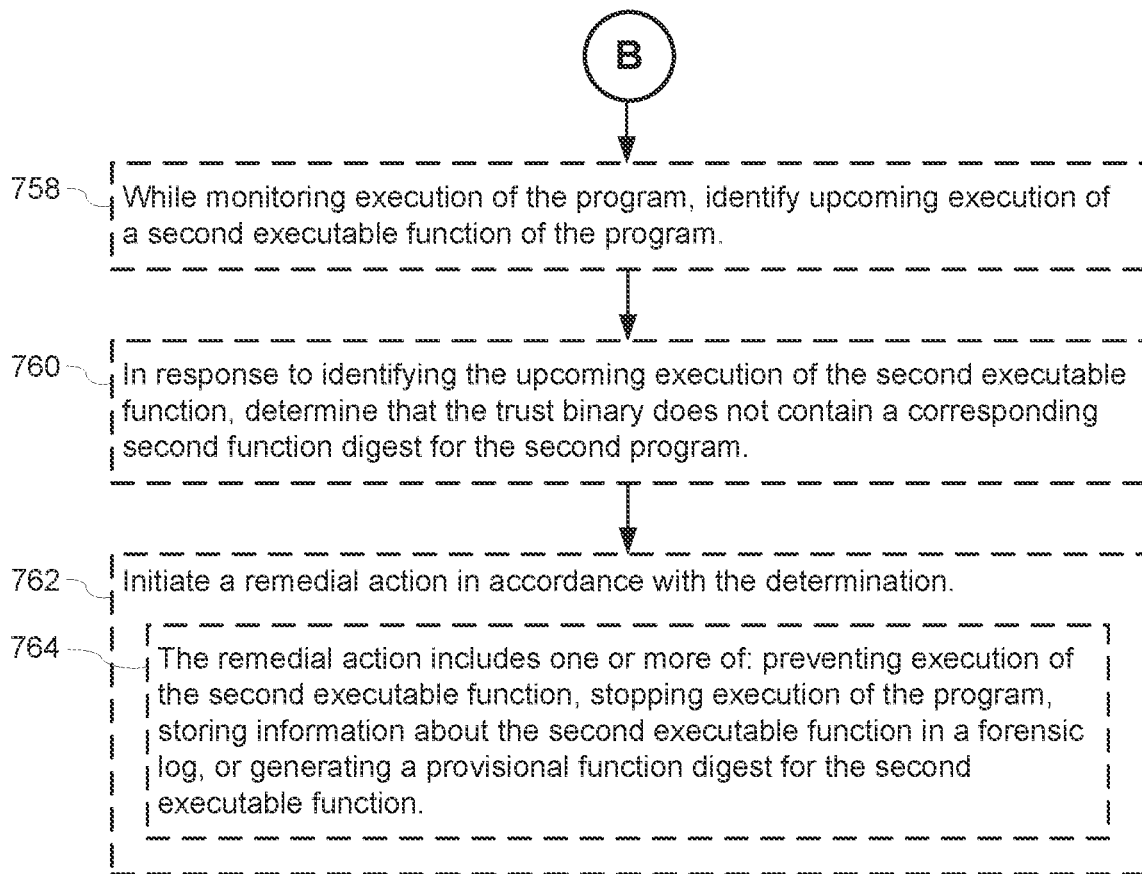

FIGS. 6A-6B provide a flowchart of a method 600 for creating trust binaries in accordance with some implementations. The method 600 is performed at a computing system (e.g., the computing device 300) having one or more processors and memory. In some implementations, the memory stores one or more programs configured for execution by the one or more processors.

The computing system obtains (602) executable code (e.g., for a program). In some implementations, a trust agent executing at the computing system obtains the executable code. In some implementations, the executable code is obtained during an installation process for a program. In some implementations, the executable code is obtained during a download process for the program. In some implementations, the executable code is obtained as part of a scan of static (e.g., non-executing) applications at the computing system (e.g., performed by the binary monitor 330). In some implementations, the computing system obtains executable code for a device driver.

In some implementations, the executable code is (604) one of: a program executable file (e.g., as illustrated in FIG. 2A), or an executable or linkable format file (e.g., as illustrated in FIG. 2B). In some implementations, the executable code is a file in a particular programming language (e.g., a .net file, a java file, a python file, or a visual basic file).

The computing system identifies (606) a plurality of executable functions from the executable code. For example, the code 216 is scanned to identify all functions of a PE file. As another example, the sections 256 are scanned to identify all functions of an ELF file. In some implementations, identifying the plurality of executable functions includes identifying functions in shared libraries (e.g., from the imports 218).

The computing system generates (608), for each executable function of the plurality of executable functions, a function digest for the executable function based on one or more static parts of the executable function. In some implementations, each function digest is generated by applying a hash function to the executable function (e.g., a secure hash function such as SHA-256).

In some implementations, the one or more static parts of the executable function include (614) one or more instructions and one or more registers. In some implementations, the one or more static parts of the executable function exclude (616) one or more dynamic address fields. In some implementations, the one or more static parts include all non-changing (e.g., non-dynamic) parts of the function.

In some implementations, the respective function digest for each executable function of the plurality of executable functions is generated (618) using a secure hash algorithm. In some implementations, the respective function digest for each executable function is generated using a cryptographic hash function. In some implementations, the respective function digest for each executable function is generated by applying two or more cryptographic hash functions to the executable function. In some implementations, each function digest includes an indication of the length of the corresponding function. In some implementations, each function digest includes an indication of the starting address, or ending address, of the corresponding function.

The computing system constructs (620) a trust binary that includes the respective digest for each executable function of the plurality of executable functions. In some implementations, the trust binary includes a digest for all executable code of a corresponding file (e.g., a PE file or ELF file). In some implementations, the trust binary includes a digest for entropy contained in the corresponding file.

In some implementations, to construct the trust binary, the computing system hashes (622) one or more of: a data directory (e.g., the data directories 212) of the program, a sections table (e.g., the sections table 214) of the program, and a program table (e.g., the program header table 254) of the program. In some implementations, constructing the trust binary includes hashing each section of the executable code for the program.

The computing system generates (624) a trust binary name by applying a hash function to a header of the executable code. In some implementations, the trust binary name is a digest of entropy contained in a header of the executable code.

In some implementations, the executable code is (625) a program executable (PE) file and generating the trust binary name includes applying the hash function to (at least one of) a DOS header and a PE header of the PE file.

In some implementations, the executable code is (626) an executable or linkable format (ELF) file and generating the trust binary name includes applying the hash function to an ELF header of the ELF file.

In some implementations, the hash function is (628) a secure hash algorithm such as an SHA-256 hash function. In some implementations, the hash function is a cryptographic hash function. In some implementations, a same hash function is used to generate the trust binary name and to generate the executable function digests.

The computing system indexes (630) the trust binary in a trust database (e.g., a trust store) utilizing the trust binary name. For example, the trust binaries 340 are stored in the trust store 338 (e.g., indexed by the trust binary name 341).

In some implementations, the trust database is (632) stored in the memory of the computing system (e.g., the trust store 338 stored in the memory 314 of the computing device 300). In some implementations, the trust database is stored remotely from the computing device. For example, FIG. 5 illustrates the trust stores 508 being remote from the devices in device groups 502.

In some implementations, the computing system sends (634) the trust binary to a server system remote from the computing system. For example, a trust binary is generated at a device within the device group 502-1 and is sent to the trust point 506-1 to be indexed and stored (e.g., stored in one of the trust store 508-1 or 508-2).

FIGS. 7A-7D provide a flowchart of a method 700 for using trust binaries in accordance with some implementations. The method 700 is performed at a computing system (e.g., the computing device 300) having one or more processors and memory. In some implementations, the memory stores one or more programs configured for execution by the one or more processors.

The computing system executes (702) a trust agent. For example, the computing device 300 executes the trust agent 324. In some implementations, the trust agent is executed as a kernel-level device driver. In some implementations, the trust agent is executed as a Ring-0 process on the computing system.

In some implementations, the computing system (704): (i) loads executable code of the trust agent into memory; (ii) obtains a trust binary for the trust agent; and (iii) confirms authenticity of the trust agent by comparing the loaded executable code with the obtained trust binary. In some implementations, as part of a start-up process for the trust agent, the trust agent validates its own trust binary (e.g., to ensure the trust agent code hasn't been tampered with). In some implementations, the trust agent uses operating system permissions to protect its associated files and data (e.g., the trust store and trust agent component files) from being tampered with. In some implementations, the trust agent includes (executes) a kernel thread to monitor files and data associated with the trust agent. In some implementations, the kernel thread continuously verifies that the files and data associated with the trust agent are not disabled or tampered with. In some implementations, if the kernel thread detects a write access to the monitored files and data, then the process that that initiated the write access is stopped (disabled) by the kernel thread. In some implementations, forensic data is obtained in accordance with the write access being detected and the trust agent generates a notification (e.g., to a user of the computing system and/or a trust center) with the forensic data.

In some implementations, the trust agent is executed (706) upon start-up of the computing device. In some implementations, trust agent is configured to execute as part of a boot (e.g., power-on) sequence for the computing system.

In some implementations, the computing system establishes (708) a plurality of kernel hooks for input/output (I/O) inspection. For example, the plurality of kernel hooks are utilized to inspect file I/O operations, registry I/O operations, thread start and stop operations, and image load and unload operations.

In some implementations, the trust agent includes (710) a kernel-level driver. For example, the trust agent 324 includes the kernel agent 326 to verify application binaries and function digests. In some implementations, the kernel agent 326 ensures that applications executing in memory are protected from attack and compromise by validating function calls and memory buffers associated with the applications.

In some implementations, the trust agent includes a driver agent (e.g., the driver agent 327), which monitors device drivers. In some implementations, the driver agent verifies a device driver by comparing a digest of the device driver to a trust binary for the device driver. In some implementations, if a trust binary is not found for the device driver, or if the digest of the device driver does not match the trust binary, the device driver is not allowed to load or is taken offline (disabled). In some implementations, the driver agent monitors functions and kernel threads executing in the device driver. In some implementations, the driver agent verifies a driver function by comparing a digest of the function with a function digest in the trust binary for the device driver. In some implementations, if a kernel thread is detected attempting to execute a function in the device driver, and the function does not have a matching function digest in the trust binary, then the driver agent stops the kernel thread and/or disable the device driver. In some implementations, the driver agent obtains (e.g., generates or captures) forensic data in accordance with detecting an unverified device driver or an unverified function executing in the device driver. In some implementations, the driver agent generates a notification (e.g., to a user of the computing system and/or to a trust center) in accordance with detecting an unverified device driver or an unverified function executing in the device driver. In some implementations, the notification includes the forensic data. In some implementations, the driver agent causes the operating system to power down (e.g., restart or reboot) in accordance with detecting an unverified device driver or an unverified function executing in the device driver. In some implementations, the driver agent recommends to a user of the computing system that the operating system power down in accordance with detecting an unverified device driver or an unverified function executing in the device driver.

In some implementations, the trust agent includes (712) a communications service, a file monitor, an installer, and a dashboard manager. For example, the trust agent 324 includes the communications service 328, the binary monitor 330, the dashboard module 332, and the installer 334.

The computing system detects (714), via the trust agent, upcoming execution of a program (e.g., an application 322) on the computing system. For example, the trust agent 324 detects that a binary file is launched in memory. In some implementations, the trust agent detects programs and/or binary files being downloaded in addition to detecting binary files being launched in memory.

In some implementations, the computing system identifies (716) a memory request corresponding to the program. For example, the trust agent 324 identifies a file I/O operation or a registry I/O operation. In some implementations, the trust agent 324 identifies an application thread attempting to start, or detects a script, JavaScript, or shellcode in a memory buffer.

The computing system obtains (720) a trust binary for the program from a trust store in the memory in response to the detection. For example, the trust agent 324 obtains a trust binary 340 from the trust store 338.

The computing system confirms (722) authenticity of the program by comparing executable code of the program with the obtained trust binary for the program. For example, the trust agent 324 generates a digest of the executable code and compares the generated digest with the trust binary.

The computing system allows (724) execution of the program in accordance with the confirmed authenticity of the program. For example, the trust agent 324 intercepts a binary file being loaded into memory and prevents the binary file from being loaded (e.g., interrupts the process) until the authenticity of the binary file is confirmed (based on the trust binary).

The computing system identifies (726) upcoming execution of an executable function of the program by monitoring execution of the program. For example, the trust agent 324 detects a function call associated with the program (e.g., a function of the program, or a function in a shared library).

In some implementations, the computing system monitors (728) system level operations of the program. For example, the trust agent 324 monitors file I/O operations, registry I/O operations, thread start and stop operations, and image load and unload operations.

In some implementations, the computing system intercepts (730) a library function call made by the program. For example, the kernel agent 326 monitors a program (application) throughout the program's lifetime in memory, including loading, running, and exiting. In some implementations, the kernel agent 326 verifies the program against the trust binaries and verifies functions in any shared libraries that get loaded. In some implementations, the trust agent 324 obtains a trust binary for the shared library and compares a digest of the library function with a function digest in the trust binary.

The computing system obtains (732), from the trust binary, a function digest corresponding to the executable function in response to identifying the upcoming execution of the executable function. For example, the trust agent 324 obtains the function digest 343-1 corresponding to the executable function.

The computing system confirms (734) authenticity of the executable function by comparing executable code of the executable function with the obtained function digest. For example, the trust agent 324 generates a digest by applying a hash to the static portions of the executable function and then compares the digest with the function digest from the trust binary.

The computing system allows (736) execution of the executable function in accordance with the confirmed authenticity of the executable function. For example, the trust agent 324 allows execution of the function in accordance with a hash of the function matching a function digest in the trust binary.

In some implementations, the computing system detects (738), via the trust agent, upcoming execution of a second program. For example, the trust agent 324 detects a binary file for a second application 522 being loaded into memory.

In some implementations, the computing system determines (740) that the trust store does not contain a corresponding second trust binary for the second program. For example, the second program is a program that has not had a trust binary created, or the second program has been modified such that a hash of a header portion of the second program does not match the trust binary name previously generated for the second program.

In some implementations, the computing system obtains (744) a second trust binary for the second program from the trust store in response to the detection. For example, the trust binary 340-1 corresponds to the first program and the trust binary 340-2 corresponds to the second program.

In some implementations, the computing system identifies (746) one or more changes in executable code of the second program based on a comparison with the second trust binary. For example, the trust binary name matches a hash of a header portion of the second program, but a hash of the code portion (e.g., the code 216) does not match with a digest of the trust binary.

In some implementations, the computing system initiates (742) a remedial action (e.g., in accordance with the determination (740) or the identification (746)). In some implementations, the remedial action includes collecting forensic data for analysis by a trust center (e.g., the trust center 402). In some implementations, the remedial action includes generating a notification (e.g., to be presented to a user of the computing system and/or sent to a trust center) for the untrusted second program.

In some implementations, the remedial action includes (748) one or more of: preventing the second program from executing, storing information about the second program in a forensic log (e.g., a forensic log 348), and generating a provisional trust binary for the second program. In some implementations, preventing the second program from executing includes intercepting a binary file of the second program being loaded into memory.

In some implementations, the remedial action includes (750) generating the provisional trust binary, and the computing system sends the executable for the second program to a trust center for validation. In some implementations, in accordance with generating the provisional trust binary, the second program is allowed to execute on the computing system for a limited period of time (e.g., for a day, two days, or a week). In some implementations, the second program is allowed to execute on the computing system until a response is received from the trust center regarding the executable for the second program. In some implementations, forensic data is sent to the trust center along with the executable for the second program, the forensic data including information about the state of the computing system and conditions under which the second program was executed. In some implementations, the trust center analyzes the executable for the second program and, optionally, any forensic data received to determine whether to trust the second program. In some implementations, validating the executable for the second program includes one or more of: checking a digital signature, checking a signing certificate path, checking the executable against one or more blacklists (e.g., local and external), and checking the executable against one or more whitelists.

In some implementations, the remedial action includes (752) applying one or more countermeasures. In some implementations, the countermeasures include detecting and preventing one or more of: heap spray, reflective injection, unknown read buffering, blocked address communication, unauthorized functions, malicious scripts, privilege escalation, function tampering, unknown shellcode, and trust tampering. In some implementations, each countermeasure is individually enabled via a policy setting (e.g., in the policy information 346). In some implementations, the policy information 346 includes an enforce, notify, or off parameter for each countermeasure.

In some implementations, detecting and preventing heap spray includes detecting that dynamic memory has been allocated for executable code insertion. In some implementations, the trust agent 324 blocks the insertion of the executable code and/or sends information about the insertion of the executable code to a trust center for analysis. In some implementations, a copy of the sprayed memory is stored in a forensic log for the event.

In some implementations, detecting and preventing reflective injections includes detecting that another process has injected an executable object into a process. In some implementations, the trust agent 324 blocks the injection of the executable object and/or sends information about the executable object to a trust center for analysis. In some implementations, a copy of the injected memory is stored in a forensic log for the event.

In some implementations, detecting and preventing unknown read buffering includes detecting that an executable file is being loaded into memory and that the executable file does not have a corresponding trust binary. In some implementations, the trust agent 324 prevents the executable file from being loaded into the memory and/or sends information about the executable file to a trust center for analysis. In some implementations, a copy of the contents of the buffer are stored in a forensic log for the event.

In some implementations, detecting and preventing blocked address communication includes detecting that a process has attempted to connected to a restricted or blocked Internet Protocol (IP) address. In some implementations, the trust agent 324 prevents communications with the restricted or blocked IP address.

In some implementations, detecting and preventing unauthorized functions includes detecting that a thread is attempting to start and that the associated function does not have a corresponding trust binary (or a corresponding function digest in a trust binary). In some implementations, the trust agent 324 prevents the thread from starting, or terminates the thread upon a determination that there is no corresponding trust binary, and/or sends information about the thread and associated function to a trust center for analysis. In some implementations, a copy of the unauthorized function is stored in a forensic log for the event.

In some implementations, detecting and preventing malicious scripts includes detecting a script (e.g., a batch file (BAT), JavaScript, or PowerShell file) in a process buffer (e.g., during file manipulation) and determining that the script includes one or more suspicious operations, such as encrypted or compressed script sections. In some implementations, the trust agent 324 prevents the script from executing and/or sends information about the script to a trust center for analysis. In some implementations, a copy of the script is stored in a forensic log for the event.

In some implementations, detecting and preventing privilege escalation includes detecting that a process has attempted to raise its privilege level in the computing system (e.g., raise the privilege level to a system level). In some implementations, the trust agent 324 prevents the process from raising its privilege level and/or sends information about the privilege escalation to a trust center for analysis.

In some implementations, detecting and preventing function tampering includes detecting that a function in a program that has been modified since it was loaded into memory. In some implementations, the trust agent 324 blocks the modified function from executing and/or sends information about the modified function to a trust center for analysis. In some implementations, information about the original function and the modified function are sent to a trust center for analysis. In some implementations, detecting and preventing unknown shellcode includes detecting shellcode in a memory buffer.

In some implementations, detecting and preventing unknown shellcode includes detecting that a buffer is allocated in a process and its page permissions are set to read/write/execute with no corresponding image or trust binary. In some implementations, the trust agent 324 blocks the shellcode from executing and/or sends information about the shellcode to a trust center for analysis. In some implementations, a shellcode memory image is stored in a forensic log for the event.

In some implementations, detecting and preventing trust tampering includes detecting that a process has attempted to modify one or more files of the trust agent or the trust store. In some implementations, the trust agent 324 blocks the process from modifying the one or more files and sends information about the trust tampering to a trust center for analysis.

In some implementations, the remedial action includes sending (754) a query to a trust center for a trust binary for the second program. For example, the trust agent 324 requests a trust binary from the trust store 338, and, upon notification that the trust store 338 does not contain the requested trust binary, the trust agent 324 requests the trust binary from the trust center.

In some implementations, the remedial action is (756) based on a trust policy obtained for the computing device. For example, the remedial action is based on a trust policy (e.g., the security policy 504-1) stored in the policy information 346.

In some implementations, the computing system identifies (758) upcoming execution of a second executable function of the program while monitoring execution of the program. For example, the kernel agent 326 identifies a call to the second executable function.

In some implementations, the computing system determines (760) that the trust binary does not contain a corresponding second function digest for the second program in response to identifying the upcoming execution of the second executable function. For example, the second function did not have a corresponding function digest created, or the second function has been modified since the corresponding function digest was created.

In some implementations, the computing system initiates (762) a remedial action in accordance with the determination. In some implementations, the remedial action includes collecting forensic data for analysis by a trust center (e.g., the trust center 402). In some implementations, the remedial action includes generating a notification (e.g., to be presented to a user of the computing system and/or sent to a trust center) for the untrusted second executable function.

In some implementations, the remedial action includes (764) one or more of: preventing execution of the second executable function, stopping execution of the program, storing information about the second executable function in a forensic log, and generating a provisional function digest for the second executable function. In some implementations, generating a provisional function digest includes generating a provisional trust binary for the program. In some implementations, the executable code for the program is sent to a trust center for validation. In some implementations, in accordance with generating the provisional function digest, the second function is allowed to execute on the computing system for a limited period of time (e.g., for a day, two days, or a week). In some implementations, the second program is allowed to execute on the computing system until a validation response is received from the trust center.

Figure 8A:
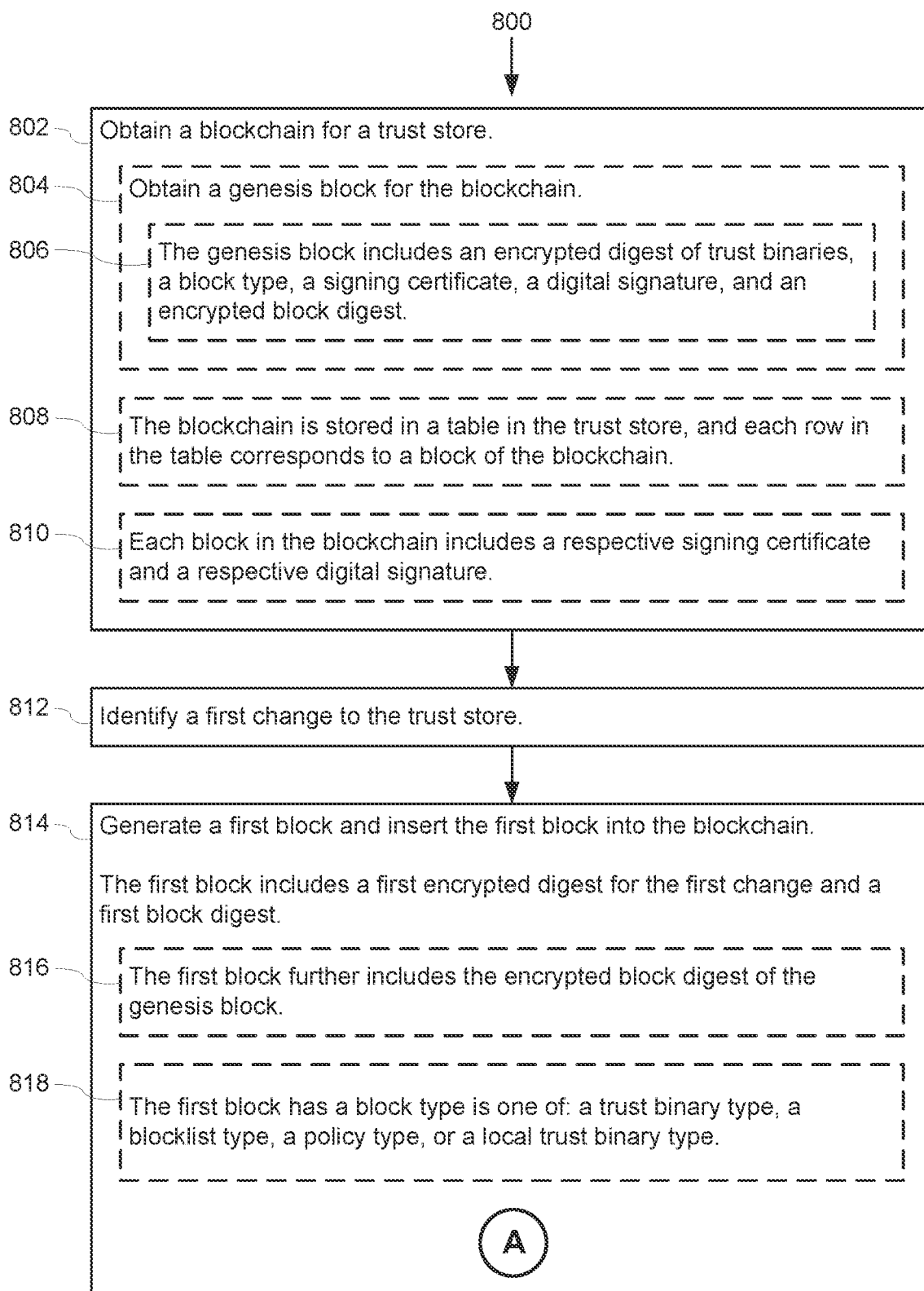
FIGS. 8A-8B provide a flowchart of an example process for using blockchain validation in accordance with some implementations.
Figure 8B:
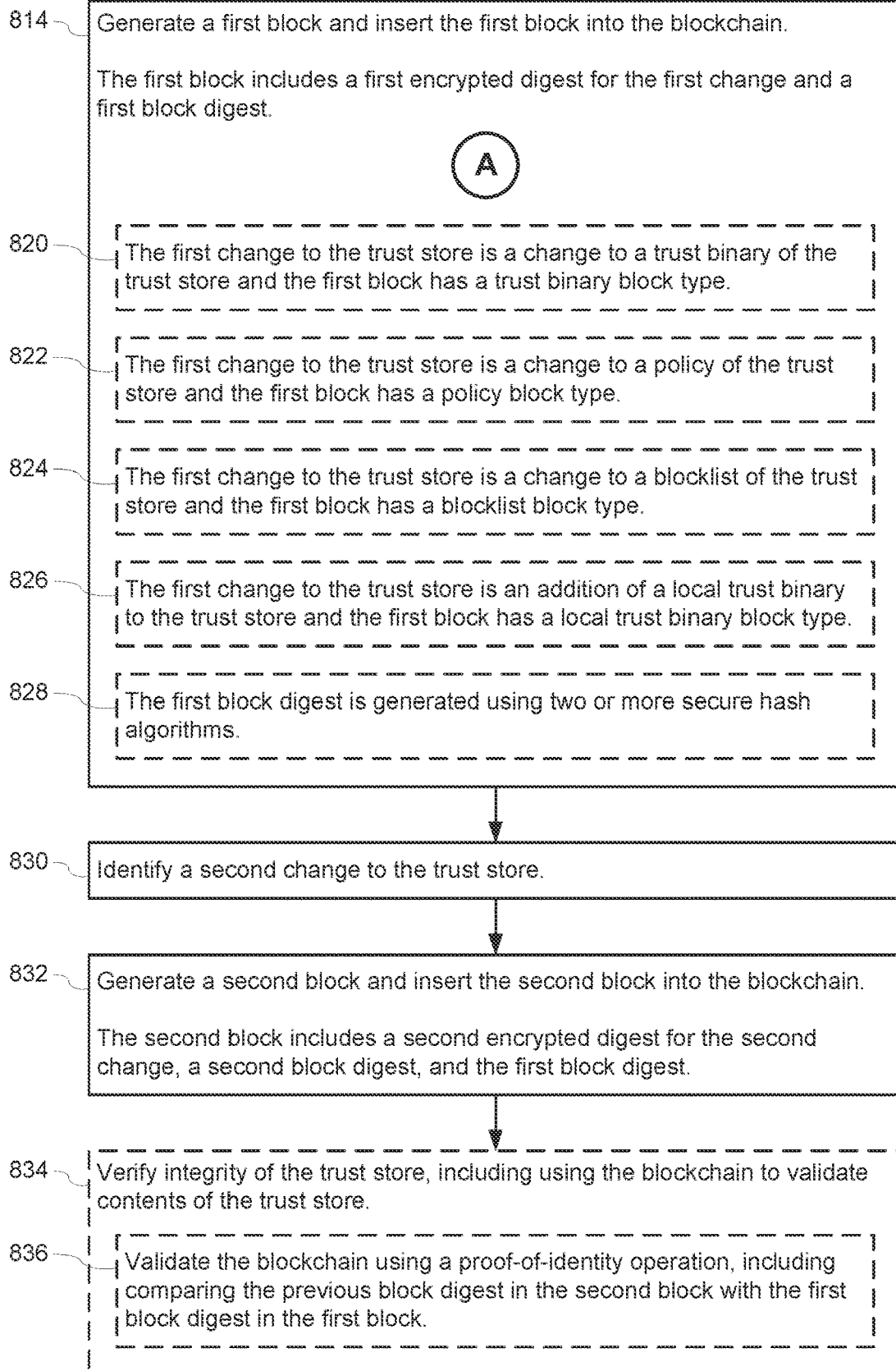

FIGS. 8A-8B provide a flowchart of a method 800 for using blockchain validation in accordance with some implementations. The method 800 is performed at a computing system (e.g., the computing device 300) having one or more processors and memory. In some implementations, the memory stores one or more programs configured for execution by the one or more processors.

The computing system obtains (802) a blockchain for a trust store. In some implementations, the computing system receives a trust store from a trust center, the trust store including the blockchain. For example, the computing device 300 receives the trust store 338 from a trust center as part of an installation process for the trust agent 324. In this example, the trust store 338 includes the at least some blockchain information when received (e.g., a genesis block).

In some implementations, the computing system obtains (804) a genesis block for the blockchain. In some implementations, the trust store is received from a trust center with a genesis block (e.g., the genesis block 345).

In some implementations, the genesis block includes (806) an encrypted digest of trust binaries (e.g., trust binary digest 353), a block type (e.g., the block type 355), a signing certificate (e.g., the signing certificate 357), a digital signature (e.g., the digital signature 358), and an encrypted block digest (e.g., the block digest 356). In some implementations, the genesis block has a trust binary block type. In some implementations, the genesis block has a signing certificate from the trust center. In some implementations, the genesis block further includes a creation timestamp (e.g., the creation timestamp 354).

In some implementations, the blockchain is stored (808) in a table in the trust store, and each row in the table corresponds to a block of the blockchain. For example, the blockchain information 344 includes a table with rows corresponding to the transaction blocks 347.

In some implementations, each block in the blockchain includes (810) a respective signing certificate and a respective digital signature. For example, the genesis block includes the signing certificate 357 and the digital signature 358 (e.g., from the trust center), and the transaction block 347-1 includes the signing certificate 372 and the digital signature 374 (e.g., from the computing device 300).

The computing system identifies (812) a first change to the trust store. In some implementations, the trust agent 324 monitors the trust store for changes. In some implementations, the trust agent 324 makes changes (e.g., updates) the trust store. In some implementations, the first change to the trust store is one of: a policy update, a trust binary update, a blocklist update, and a provisional trust binary update.

The computing system generates (814) a first block and inserts the first block into the blockchain, the first block including a first encrypted digest for the first change (e.g., the transaction digest 364) and a first block digest (e.g., the block digest 370). For example, the computing device 300 generates the transaction block 347-1 in response to a first transaction, and the transaction block 347-1 includes the transaction digest 364.

In some implementations, the first block further includes (816) the encrypted block digest of the genesis block. For example, the transaction block 347-1 includes the previous block digest 360 corresponding to the block digest 356 of the genesis block 345.

In some implementations, the first block has (818) a block type selected from the group consisting of: a trust binary type, a blocklist type, a policy type, and a local trust binary type. In some implementations, each type of change to the trust store has a corresponding block type. In some implementations, the block types further include a forensic type corresponding to a forensic change to the trust store (e.g., an update to the forensic logs 348).

In some implementations, the first change to the trust store is (820) a change to a trust binary of the trust store and the first block has a trust binary block type. For example, a new trust binary is obtained (e.g., from the trust center) and, in response, the transaction block 347-1 is generated with a trust binary block type.

In some implementations, the first change to the trust store is (822) a change to a policy of the trust store and the first block has a policy block type. For example, a new policy is obtained (e.g., from the trust center, or from a user of the computing system) and, in response, the transaction block 347-1 is generated with a policy block type.

In some implementations, the first change to the trust store is (824) a change to a blocklist of the trust store and the first block has a blocklist block type. For example, a blocklist update is obtained (e.g., from the trust center) and, in response, the transaction block 347-1 is generated with a blocklist block type.

In some implementations, the first change to the trust store is (826) an addition of a local trust binary to the trust store and the first block has a local trust binary block type. For example, a new provisional trust binary is generated at the computing system and, in response, the transaction block 347-1 is generated with a local trust binary block type.

In some implementations, the first block digest is generated (828) using two or more secure hash algorithms. For example, the first block digest is generated by applying two or more secure hash algorithms (e.g., SHA-256 hash functions) to the contents of the first block.

The computing system identifies (830) a second change to the trust store. In some implementations, the second change is a different type of change from the first change. For example, the first change is a trust binary update, and the second change is a policy update. In some implementations, the second change is a same type of change as the first change. For example, the first change is a first trust binary update, and the second change is a second trust binary update.

The computing system generates (832) a second block and inserts the second block into the blockchain, the second block including a second encrypted digest for the second change (e.g., the transaction digest 378), a second block digest (e.g., the block digest 384), and the first block digest (e.g., the previous block digest 376).

In some implementations, the computing system verifies (834) integrity of the trust store, including using the blockchain to validate contents of the trust store. For example, the computing system compares a digest of the trust binaries 340 with digests of one or more trust binary blocks of the blockchain 350 and validates the trust store in accordance with a match. As another example, the computing system compares a digest of the policy information 346 with digests of one or more policy blocks of the blockchain 350 and validates the trust store in accordance with a match.

In some implementations, the computing system validates (836) the blockchain using a proof-of-identity operation, including comparing the previous block digest in the second block with the first block digest in the first block. In some implementations, verifying the integrity of the trust store includes validating the blockchain. In some implementations, the proof-of-identity operation includes, for each transaction block 347, comparing the previous block digest of the transaction block 347 with the block digest of the preceding block in the blockchain 350. For example, comparing the previous block digest 360 in the transaction block 347-1 with the block digest 356 of the genesis block 345.

Turning now to some example implementations.

(A1) In one aspect, some implementations include a method (e.g., the method 600) for creating trust binaries. The method is performed at a computing system (e.g., the computing device 300) having memory (e.g., the memory 314) and one or more processors (e.g., the CPU(s) 302). The method includes: (i) obtaining executable code for a program (e.g., an application 322); (ii) identifying a plurality of executable functions from the executable code; (iii) for each executable function of the plurality of executable functions, generating a respective function digest based on one or more static parts of the respective executable function; (iv) constructing a respective trust binary comprising the respective digest for each executable function of the plurality of executable functions; (v) generating a trust binary name by applying a hash function to a header of the executable code; and (vi) indexing the trust binary in a trust database (e.g., the trust store 338) utilizing the trust binary name.

(A2) The method of A1, where generating the respective function digest for a respective function is further based on a respective starting address of the respective executable function. In some implementations, an ending address is obtained and used instead of, or in addition to, the starting address. In some implementations, the digest is generated using the ending address, or an offset address, rather than the starting address. In some implementations, the trust binary name is based on a determined entropy of the header of the executable code.

(A3) The method of A1 or A2, where the executable code is one of: a program executable file or an executable and linkable format (ELF) file. In some implementations, the executable code is a programming language file, such as a .NET file, a java file, a python file, a visual basic file, or the like.

(A4) The method of A3, where the executable code is a program executable (PE) file and generating the trust binary name includes applying the hash function to a DOS header (e.g., the DOS header 206) and/or a PE header (e.g., the PE header 208) of the PE file. In some implementations, the hash function is a cryptographic hash function (e.g., an SHA-256 hash function).

(A5) The method of A3, where the executable code is an executable and linkable format (ELF) file and generating the trust binary name includes applying the hash function to an ELF header (e.g., the ELF header 252) of the ELF file. In some implementations, the hash function is a cryptographic hash function (e.g., an SHA-256 hash function).

(A6) The method of any of A1-A5, where the one or more static parts of each executable function include one or more instructions and/or one or more portions representing static data. In some implementations, the one or more static parts include all static parts of the executable function.

(A7) The method of any of A1-A6, where the one or more static parts of each executable function exclude dynamic address fields. In some implementations, the one or more static parts of the executable function include all parts of the executable function except any dynamic address fields.

(A8) The method of any of A1-A7, where constructing the trust binary includes hashing one or more of: a data directory of the program, a sections table of the program, and a program table of the program. In some implementations, constructing the trust binary includes hashing code, data, and import sections of the executable code (e.g., the sections 216, 218, and 220).

(A9) The method of any of A1-A8, where the hash function is, or includes, a secure hash algorithm (e.g., an SHA-256 hash function). In some implementations, a same hash function is used to construct the trust binary and to generate the trust binary name. In some implementations, different hash functions are used to construct the trust binary and to generate the trust binary name (e.g., with different levels of encryption).

(A10) The method of any of A1-A9, where the respective function digest for each executable function of the plurality of executable functions is generated using a secure hash algorithm. In some implementations, generating a function digest of an executable function includes applying a secure hash algorithm to all static parts of the executable function.

(A11) The method of any of A1-A10, where the trust database is stored in the memory of the computing device (e.g., as part of a trust store 338). In some implementations, the trust database is a relational database (e.g., a structured query language (SQL) database). In some implementations, the trust store includes the trust binaries (e.g., the trust binaries 340), a blocklist (e.g., the blocklist 342), a blockchain for validation (e.g., the blockchain information 344), and one or more security policies (e.g., the policy information 346). In some implementations, the trust store operates on a virtual machine (e.g., a virtual machine in memory of the computing device 300).

(A12) The method of any of A1-A11, further including sending the trust binary to a server system (e.g., the trust center 402) remote from the computing device. In some implementations, the server system adds the trust binary to a whitelist of trust binaries. In some implementations, the server system sends the trust binary to one or more other trust stores.

(A13) The method of any of A1-A12, further including sending the executable code to a server system remote from the computing device. In some implementations, the trust binary is a provisional trust binary, and the computing system sends the executable code to the server system to validate the executable code. In some implementations, validating the executable code includes one or more of: checking a digital signature, checking a signing certificate path, checking the executable against one or more blacklists (e.g., local and external), and checking the executable against one or more whitelists. In some implementations, the computing system receives a notification from the server system in response to the sending the executable code. In some implementations, in accordance with the notification validating the executable code, the computing system changes the provisional trust binary to a (non-provisional) trust binary. In some implementations, in accordance with the notification invalidating the executable code, the computing system deletes the program or prevents the program from executing in the future. In some implementations, in accordance with the notification invalidating the executable code, the program (or the executable code) is added to the blocklist 342. In some implementations, in accordance with the notification invalidating the executable code, the provisional trust binary is removed from the trust store and/or is added to the blocklist information.

(A14) The method of any of A1-A13, further including: (i) obtaining executable code for a device driver; (ii) identifying a plurality of executable functions from the executable code; (iii) for each executable function of the plurality of executable functions, generating a respective function digest based on one or more static parts of the respective executable function; (iv) constructing a respective trust binary comprising the respective digest for each executable function of the plurality of executable functions; (v) generating a trust binary name by applying a hash function to a header of the executable code; and (vi) indexing the trust binary in a trust database (e.g., the trust store 338) utilizing the trust binary name.

(B1) In another aspect, some implementations include a method (e.g., the method 700) for using trust binaries. The method is performed at a computing system (e.g., the computing device 300) having memory (e.g., the memory 314) and one or more processors (e.g., the CPU(s) 302). The method includes: (i) executing a trust agent (e.g., the trust agent 324); (ii) detecting, via the trust agent, upcoming execution of a program (e.g., an application 322); (iii) in response to the detection, obtaining a trust binary (e.g., a trust binary 340) for the program from a trust store (e.g., the trust store 338) in the memory; (iv) confirming authenticity of the program by comparing executable code of the program with the obtained trust binary for the program; (v) allowing execution of the program in accordance with the confirmed authenticity of the program; (vi) identifying upcoming execution of an executable function in the program by monitoring execution of the program; (vii) in response to identifying the upcoming execution of the executable function, obtaining, from the trust binary, a function digest (e.g., a function digest 343) corresponding to the executable function; (viii) confirming authenticity of the executable function by comparing executable code of the executable function with the obtained function digest; and (ix) allowing execution of the executable function in accordance with the confirmed authenticity of the executable function. In some implementations, confirming authenticity of the program includes confirming authenticity of one or more shared libraries used by the program (e.g., by comparing with corresponding trust binaries). In some implementations, obtaining a trust binary includes generating a binary name for the program and looking up the trust binary in the trust store using the generated binary name. In some implementations, comparing executable code of the program with the obtained trust binary for the program includes generating a digest of the executable code and comparing the generated digest with the obtained trust binary. In some implementations, comparing executable code of the executable function with the obtained function digest includes generating a digest of the executable code of the executable function and comparing the generated digest with the obtained function digest.

(B2) The method of B1, where executing the trust agent includes establishing a plurality of kernel hooks for input/output (I/O) inspection. For example, the kernel agent 326 of the trust agent 324 establishes a plurality of kernel hooks as part of a start-up procedure.

(B3) The method of B1 or B2, where detecting upcoming execution of the program includes identifying a memory request corresponding to the program. For example, the kernel agent 326 detects a binary file for the program loaded into a memory buffer.

(B4) The method of any of B1-B3, where identifying upcoming execution of the executable function of the program includes intercepting a library function call made by the program. For example, a call to a function in a shared library. In some implementations, in response to detecting a call to a function in a shared library, the trust agent obtains a trust binary for the shared library and compares a digest of the called function with the corresponding function digest in the trust binary for the shared library.

(B5) The method of any of B1-B4, where monitoring execution of the program includes monitoring system level operations of the program. In some implementations, the system level operations include one or more of: file I/O operations, registry I/O operations, thread start and stop operations, and image load and unload operations.

(B6) The method of any of B1-B5, where the trust agent is executed upon start-up of the computing system. In some implementations, the trust agent is specific to an operating system of the computing system. For example, a first type of trust agent is used for a Windows operating system, a second type of trust agent is used for an Android operating system, a third type of trust agent is used for iPhone operating system (iOS), and a fourth type of trust agent is used for a Linux operating system.

(B7) The method of any of B1-B6, where the trust agent includes a kernel-level driver (e.g., the kernel agent 326). In some implementations, the kernel-level driver is a device driver that runs at Ring-0 on the computing system.

(B8) The method of any of B1-B7, where the trust agent includes a communications service (e.g., the communications service 328), a file monitor (e.g., the binary monitor 330), an installer (e.g., the installer 334), and a dashboard manager (e.g., the dashboard module 332). In some implementations, the communication service includes a user-mode privileged process that handles communication between the kernel driver, the file monitor, the dashboard manager, and a trust center. In some implementations, the communication service communicates with a trust center (e.g., on a periodic basis) to receive policy updates, trust binary updates, and/or software updates. In some implementations, the file monitor creates, stores, and validates trust binaries. In some implementations, the file monitor monitors memory of the computing device to validate programs and functions (and generate corresponding alerts). In some implementations, the file monitor runs as a privileged service at low priority (e.g., uses spare kernel cycles). In some implementations, the dashboard manager allows view and exportation of alerts, creation of new (provisional) trust binaries, modification of trust agent settings and/or policy. In some implementations, the installer probes the computing system and discovers executable files and code, requests trust binaries (e.g., from the trust center 402), and installs other components of the trust agent (e.g., the kernel agent 326).

(B9) The method of any of B1-B8, where executing the trust agent includes: (i) loading executable code of the trust agent into memory; (ii) obtaining a trust binary for the trust agent; and (iii) confirming authenticity of the trust agent by comparing the loaded executable code with the obtained trust binary. In some implementations, confirming authenticity includes checking for unauthorized access to file, folders, registry settings, and configuration settings of the trust agent (e.g., by performing a proof-of-identity operation on a blockchain of the trust store). In some implementations, comparing the loaded executable code with the obtained trust binary includes generating a digest of the loaded executable code and comparing the generated digest with the obtained trust binary.

(B10) The method of any of B1-B9, further including: (i) detecting, via the trust agent, upcoming execution of a second program; (ii) determining that the trust store does not contain a trust binary corresponding to the second program; and (iii) initiating a remedial action in accordance with the determination (e.g., the operations 738, 740, and 742 described previously with reference to FIG. 7C).

(B11) The method of B10, where the remedial action includes one or more of: (i) preventing the second program from executing on the computing system; (ii) storing information about the second program in a forensic log; and (iii) generating a provisional (local) trust binary for the second program. In some implementations, the forensic log and a corresponding notification are sent to a trust center. In some implementations, a copy of the second program is sent to the trust center for analysis and verification. In some implementations, verification includes one or more of: a virus scan, blocklist checking, signature verification, certificate chain verification, and vulnerability analysis. In some implementations, the trust center sends a response to the computing system based on an outcome of the verification. In some implementations, in accordance with the notification validating the second program, the computing system changes the provisional trust binary to a (non-provisional) trust binary. In some implementations, in accordance with the notification invalidating the second program, the computing system deletes the second program or second prevents the program from executing in the future. In some implementations, in accordance with the notification invalidating the second program, the second program is added to a blocklist. In some implementations, in accordance with the notification invalidating the second program, the provisional trust binary is removed from the trust store and/or is added to the blocklist information.

(B12) The method of B10 or B11, where the remedial action includes generating a provisional trust binary, and the method further includes sending executable code for the second program to a trust center (e.g., the trust center 510) for validation. In some implementations, in response to sending the executable code to the trust center, the trust agent receives a validation response indicating whether the provisional trust binary should be converted to a trust binary.

(B13) The method of any of B10-B12, where the remedial action includes applying one or more countermeasures (e.g., the countermeasures described previously with respect to operation 752 of the method 700). In some implementations, the countermeasures include monitoring for heap spray, reflective injection, read buffering, access to a blocked IP address, unauthorized function calls, malicious script (JavaScript) execution, privilege tampering, shellcode buffering, and trust agent tampering.

(B14) The method of any of B10-B13, where the remedial action comprises sending a query to a trust center (e.g., the trust center 510) for a trust binary for the second program. In some implementations, in response to the query the trust center sends either a trust binary for the second program or sends an indication that the trust center does not contain a trust binary for the second program.

(B15) The method of any of B10-B14, further including obtaining a trust policy for the computing device, where the initiated remedial action is selected according to the trust policy. For example, the computing device is an OT device and the trust policy dictates preventing any untrusted execution. As another example, the computing device is an IT device and the trust policy dictates allowing untrusted execution, but applying countermeasures and/or conditions (e.g., monitoring and recording). In some implementations, the trust policy includes remedial action settings, update settings, and deployment settings.

(B16) The method of any of B1-B15, further including: (i) detecting, via the trust agent, upcoming execution of a second program (e.g., an application 322); (ii) in response to the detection, obtaining a second trust binary (e.g., the trust binary 340-2) for the second program from the trust store; (iii) identifying one or more changes in executable code of the second program based on a comparison with the second trust binary (e.g., a comparison of a hash of the executable code with a digest in the second trust binary); and (iv) initiating a remedial action in accordance with the identification of the one or more changes.

(B17) The method of any of B1-B16, further including: (i) while monitoring execution of the program, identifying upcoming execution of a second executable function of the program; (ii) in response to identifying the upcoming execution of the second executable function, determining that the trust binary does not contain a function digest for the second executable function; and (iii) initiating a remedial action in accordance with the determination.

(B18) The method of B17, where the remedial action includes one or more of: (i) preventing execution of the second executable function; (ii) stopping execution of the program; (iii) storing information about the second executable function in a forensic log; and (iv) generating a provisional function digest for the second executable function.

(B19) The method of any of B1-B18, further including: (i) identifying upcoming execution of a second executable function of the program; (ii) in response to identifying the upcoming execution of the second executable function, obtaining, from the trust binary, a second function digest corresponding to the second executable function; (iii) identifying one or more changes in the second executable function based on a comparison with the second function digest; and (iv) initiating a remedial action in accordance with the identification of the one or more changes in the second executable function.

(B20) The method of any of B1-B19, further including: (i) detecting, via the trust agent, upcoming execution of a device driver; (ii) in response to the detection, obtaining a trust binary for the device driver from a trust store in the memory; (iii) confirming authenticity of the device driver by comparing executable code of the device driver with the obtained trust binary for the device driver; (iv) allowing execution of the device driver in accordance with the confirmed authenticity of the device driver; (v) identifying upcoming execution of an executable function in the device driver by monitoring execution of the device driver; (vi) in response to identifying the upcoming execution of the executable function, comparing a function digest of the executable function with one or more function digests in the trust binary; and (vii) based on an outcome of the comparison, preventing execution of the executable function (e.g., in accordance with not identifying a match between the function digest of the executable function and the one or more function digests in the trust binary).

(C1) In another aspect, some implementations include a method (e.g., the method 800) for using blockchain validation. The method is performed at a computing system (e.g., the computing device 300) having memory (e.g., the memory 314) and one or more processors (e.g., the CPU(s) 302). The method includes: (i) accessing a trust store (e.g., the trust store 338) for the computing system, including obtaining a blockchain (e.g., the blockchain 350) for the trust store; (ii) identifying a first change (e.g., a first transaction) to the trust store; (iii) in response to identifying the first change, generating a first block (e.g., the transaction block 347-1) and inserting the first block into the blockchain, where the first block includes a first encrypted digest for the first change (e.g., the transaction digest 364) and a first block digest (e.g., the block digest 370); (iv) identifying a second change (e.g., a second transaction) to the trust store; and (v) in response to identifying the second change, generating a second block (e.g., the transaction block 347-2) and inserting the second block into the blockchain, where the second block includes a second encrypted digest for the second change (e.g., the transaction digest 378), a second block digest (e.g., the block digest 384), and the first block digest (e.g., the previous block digest 376). In some implementations, each block includes a block digest for the block and a previous block digest for the previous block in the chain (e.g., as shown in FIG. 3C).

(C2) The method of C1, where obtaining the blockchain includes obtaining a genesis block (e.g., the genesis block 345) for the blockchain. In some implementations, the trust store and the genesis block are obtained from a trust center (e.g., as part of an installation process for a trust agent).

(C3) The method of C2, where the genesis block includes: an encrypted digest of trust binaries (e.g., trust binaries pre-installed by the trust center), a block type, a signing certificate, a digital signature, and an encrypted block digest. In some implementations, the genesis block further includes a creation timestamp. In some implementations, the genesis block further includes an empty previous block digest. In some implementations, the signing certificate comprises an identity of the block creator (e.g., the trust center 510).

(C4) The method of C3, where the first block further includes the encrypted block digest of the genesis block. For example, the transaction block 347-1 includes a previous block digest 360 corresponding to the block digest 356 of the genesis block 345.

(C5) The method of any of C1-C4, where the first block has a block type selected from the group consisting of: a trust binary type, a blocklist type, a policy type, and a local trust binary type.

(C6) The method of any of C1-C5, where the first change to the trust store includes a change to a trust binary of the trust store, and where the first block has a trust binary block type. In some implementations, the first change is an addition of a trust binary to the trust store. In some implementations, the first change is removal of a trust binary (or a provisional trust binary) from the trust store.

(C7) The method of any of C1-C5, where the first change to the trust store includes a change to a policy of the trust store (e.g., a change in the policy information 346), and where the first block has a policy block type.

(C8) The method of any of C1-C5, where the first change to the trust store includes a change to a blocklist of the trust store, and where the first block has a blocklist block type. For example, the first change is an addition of a program, application, script, or function to the blocklist 342.

(C9) The method of any of C1-C5, where the first change to the trust store includes an addition of a local (provisional) trust binary to the trust store, and where the first block has a local (provisional) trust binary block type.

(C10) The method of any of C1-C9, further including, after generating the second block, verifying integrity of the trust store, including using the blockchain to validate contents of the trust store. In some implementations, the verification occurs in accordance with a trust agent start-up procedure.

(C11) The method of C10, where verifying integrity of the trust store further includes validating the blockchain using a proof-of-identity operation, including comparing the first block digest in the second block (e.g., the previous block digest 376) with the first block digest in the first block (e.g., the block digest 370).

(C12) The method of any of C1-C11, where the first encrypted digest is generated using two or more secure hash algorithms (e.g., successive SHA-256 operations).

(C13) The method of any of C1-C12, where the blockchain is stored in a table in the trust store, and each row in the table corresponds to a block of the blockchain. For example, the blockchain 350 is stored in a table of the trust store 338.

(C14) The method of any of C1-C13, where each block in the blockchain includes a respective signing certificate and a respective digital signature. In some implementations, the signing certificate for the first block (e.g., the signing certificate 372) corresponds to a client certificate stored in a policy table of the trust store. In some implementations, the digital signature for the first block (e.g., the digital signature 374) corresponds to an encrypted key stored in the policy table of the trust store.

In another aspect, some implementations include a computing system including one or more processors and memory coupled to the one or more processors, the memory storing one or more programs configured to be executed by the one or more processors, the one or more programs including instructions for performing any of the methods described herein (e.g., A1-A14, B1-B20, and C1-C14 above and E1-E11 below).

In yet another aspect, some implementations include a non-transitory computer-readable storage medium storing one or more programs for execution by one or more processors of a computing system, the one or more programs including instructions for performing any of the methods described herein (e.g., A1-A14, B1-B20, and C1-C14 above and E1-E11 below).

(D1) In yet another aspect, some implementations include a non-transitory computer-readable storage medium, including: a trust database (e.g., the trust store 338) storing a plurality of trust binaries (e.g., the trust binaries 340), each trust binary corresponding to a respective executable program; each trust binary of the plurality of trust binaries including: (a) a respective trust binary name (e.g., the trust binary name 341) generated by applying a hash function to a respective header (e.g., the ELF header 252) of the respective executable program; and (b) a respective function digest (e.g., a function digests 343) for each executable function identified in the respective executable program, where the respective function digest is generated based on a respective starting address and one or more respective static parts of the respective executable function; and where the plurality of trust binaries are indexed in the trust database using their respective trust binary names. In some implementations, the memory 314 includes the non-transitory computer-readable storage medium.

(D2) The non-transitory computer-readable storage medium of D1, where the trust database further stores policy information. In some implementations, the policy information includes one or more security policies (e.g., the security policy 504-2). In some implementations, the policy information includes a policy table (e.g., including a client certificate and an encrypted key for a computing device).

(D3) The non-transitory computer-readable storage medium of D1 or D2, where the trust database further stores one or more forensic logs (e.g., the forensic logs 348). For example, the forensic logs include memory buffer information, state information, and process information for instances where untrusted applications and functions are detected.

(D4) The non-transitory computer-readable storage medium of any of D1-D3, where each respective function digest represents a hashed version of the corresponding executable function. In some implementations, each function digest is generated by applying a secure hash algorithm to static portions of the corresponding executable function.

(D5) The non-transitory computer-readable storage medium of any of D1-D4, where the trust database further stores blockchain information for authenticating the trust database. In some implementations, the blockchain information includes a blockchain (e.g., the blockchain 350) with a block for each change to the trust database.

(D6) The non-transitory computer-readable storage medium of D5, where the blockchain information includes a plurality of blocks (e.g., the transaction blocks 347), and where each block of the plurality of blocks includes a block type (e.g., the block type 368), a signing certificate (e.g., the signing certificate 372), a digital signature (e.g., the digital signature 374), and a digest (e.g., the transaction digest 364).

(D7) The non-transitory computer-readable storage medium of D6, where the plurality of blocks includes a genesis block (e.g., the genesis block 345) and a block corresponding to each respective change that has occurred within the trust store (e.g., the transaction blocks 347).

(D8) The non-transitory computer-readable storage medium of D6 or D7, where each block of the plurality of blocks has a block type selected from the group consisting of: a trust binary type, a blocklist type, a policy type, and a local binary type.

(D9) The non-transitory computer-readable storage medium of any of D6-D8, where, for each block of the plurality of blocks, the respective digest is encrypted using at least two secure hash algorithms. In some implementations, the respective digest is encrypted by applying successive secure hash algorithms. In some implementations, the respective digest is encrypted by applying a secure hash algorithm twice in succession.

(D10) The non-transitory computer-readable storage medium of any of D6-D9, where each block of the plurality of blocks further includes the respective block digest for the previous block in the blockchain. For example, the transaction block 347-2 includes the previous block digest 376 corresponding to the block digest 370 of the transaction block 347-1.

(D11) The non-transitory computer-readable storage medium of any of D1-D10, wherein the trust database further stores a second plurality of trust binaries, each trust binary of the second plurality of trust binaries corresponding to a respective device driver; each trust binary of the plurality of trust binaries including: (a) a respective trust binary name (e.g., the trust binary name 341) generated by applying a hash function to a respective header of the respective device driver; and (b) a respective function digest (e.g., a function digests 343) for each executable function identified in the respective device driver, where the respective function digest is generated based on a respective starting address and one or more respective static parts of the respective executable function; and where the second plurality of trust binaries are indexed in the trust database using their respective trust binary names.

(E1) In another aspect, some implementations include a method for monitoring network traffic. The method is performed at a computing device (e.g., the gateway device 108) having memory and one or more processors. In some implementations, the method is performed at a computing system (e.g., the computing device 300) having memory (e.g., the memory 314) and one or more processors (e.g., the CPU(s) 302). The method includes: (i) monitoring network packets; (ii) identifying an executable file (e.g., the executable file 200) in the network packets; (iii) determining whether a trust store (e.g., the trust store 338) includes a trust binary (e.g., the trust binary 340) corresponding to the executable file; and (iv) in accordance with a determination that the trust store does not include the trust binary corresponding to the executable file, performing a remedial action.

(E2) The method of E1, where the remedial action includes one or more of: quarantining the executable file; rejecting the executable file; dropping the packet(s) containing the executable file; and redirecting the packet(s) containing the executable file. In some implementations, the remedial action is performed in accordance with an active policy (e.g., the policy information 346).

(E3) The method of E1 or E2, further including: performing a malware check on the network packets; identifying malware within the network packets; and performing a remedial action. In some implementations, the remedial action includes one or more of: quarantining the malware; rejecting the malware; dropping the packet(s) containing the malware; and redirecting the packet(s) containing the malware.

(E4) The method of any of E1-E3, further including: identifying restricted information in one or more of the network packets; and rejecting the network packets containing the restricted information. In some implementations, the restricted information includes personally identifiable information (PII), confidential information, financial information, and the like.

(E5) The method of any of E1-E4, further including: profiling the network packets; and taking action on the network packets based on the profiling, including one or more of: prioritizing, filtering, and redirecting. In some implementations, taking action includes filtering out attacks and/or deprioritizing video data. In some implementations, action is taken in accordance with an active policy (e.g., the policy information 346).

(E6) The method of E5, further including presenting a dashboard with information regarding the profiling and the corresponding action to a user. In some implementations, the dashboard is a user interface. In some implementations, the dashboard enables a user to set or adjust policy rules (e.g., regarding remedial action, and/or filtering, prioritization, and redirection of network packets).

(E7) The method of any of E1-E6, further including: identifying a subset of the network packets as corresponding to a particular application; and performing a policy action on the subset of the network packets in accordance with a policy for the particular application.

(E8) The method of any of E1-E7, where the computing device is a gateway device (e.g., the gateway device 108).

(E9) The method of E8, where the gateway device includes a network-on-chip (NIC) component. For example, the gateway device includes a smart NIC. In some implementations, the NIC component is a secure intelligent adapter (SIA) network card.

(E10) The method of E8 or E9, where the gateway device includes instructions on an x86 appliance or virtual machine.

(E11) The method of any of E1-E10, where the network packets are monitored using one or more machine learning algorithms. For example, Appendix A describes using machine learning to identify unknown attacks within network data.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed at a computing device having memory and one or more processors, the method comprising:
    executing a trust agent;
    detecting, via the trust agent, upcoming execution of a program on the computing device;
    in response to the detection, obtaining a trust binary for the program from a trust store in the memory;
    confirming authenticity of the program by comparing executable code of the program with the obtained trust binary for the program;
    allowing execution of the program in accordance with the confirmed authenticity of the program;
    identifying upcoming execution of an executable function in the program by monitoring execution of the program;
    in response to identifying the upcoming execution of the executable function, obtaining, from the trust binary, a function digest corresponding to the executable function, wherein the function digest comprises a hash of static portions of the executable function, omitting portions of the executable function that require dynamic linking when loaded into memory;
    confirming authenticity of the executable function by comparing executable code of the executable function with the obtained function digest; and
    allowing execution of the executable function in accordance with the confirmed authenticity of the executable function.

2. The method of claim 1, wherein detecting upcoming execution of the program comprises identifying a memory request corresponding to the program.

3. The method of claim 1, wherein identifying upcoming execution of the executable function of the program comprises intercepting a library function call made by the program.

4. The method of claim 1, wherein the trust agent comprises a kernel-level driver.

5. The method of claim 1, wherein the trust agent comprises a communications service, a file monitor, an installer, and a dashboard manager.

6. The method of claim 1, further comprising:
    detecting, via the trust agent, upcoming execution of a second program; determining that the trust store does not contain a trust binary corresponding to the second program; and
    initiating a remedial action in accordance with the determination.

7. The method of claim 6, wherein the remedial action comprises one or more of:
    preventing the second program from executing on the computing device;
    storing information about the second program in a forensic log; and
    generating a provisional trust binary for the second program.

8. The method of claim 6, wherein the remedial action comprises generating a provisional trust binary, and the method further comprises sending executable code for the second program to a trust center for validation.

9. The method of claim 6, wherein the remedial action comprises applying one or more countermeasures.

10. The method of claim 6, wherein the remedial action comprises sending a query to a trust center for a trust binary for the second program.

11. The method of claim 6, further comprising obtaining a trust policy for the computing device, wherein the initiated remedial action is selected according to the trust policy.

12. The method of claim 1, further comprising:
    detecting, via the trust agent, upcoming execution of a second program;
    in response to the detection, obtaining a second trust binary for the second program from the trust store;
    identifying one or more changes in executable code of the second program based on a comparison with the second trust binary; and
    initiating a remedial action in accordance with the identification of the one or more changes.

13. The method of claim 1, further comprising:
    while monitoring execution of the program, identifying upcoming execution of a second executable function of the program;
    in response to identifying the upcoming execution of the second executable function, determining that the trust binary does not contain a function digest for the second executable function; and
    initiating a remedial action in accordance with the determination.

14. The method of claim 13, wherein the remedial action comprises one or more of:
    preventing execution of the second executable function;
    stopping execution of the program;
    storing information about the second executable function in a forensic log; and
    generating a provisional function digest for the second executable function.

15. The method of claim 1, further comprising:
    identifying upcoming execution of a second executable function of the program;
    in response to identifying the upcoming execution of the second executable function, obtaining, from the trust binary, a second function digest corresponding to the second executable function;
    identifying one or more changes in the second executable function based on a comparison with the second function digest; and
    initiating a remedial action in accordance with the identification of the one or more changes in the second executable function.

16. The method of claim 1, wherein comparing executable code of the executable function with the obtained function digest comprises comparing (1) a hash of static portions of the executable function with (2) the obtained function digest.

17. A computing device, comprising:
    one or more processors;
    memory;
    a display; and
    one or more programs stored in the memory and configured for execution by the one or more processors, the one or more programs comprising instructions for:
    executing a trust agent;
    detecting, via the trust agent, upcoming execution of a program on the computing device;
    in response to the detection, obtaining a trust binary for the program from a trust store in the memory;
    confirming authenticity of the program by comparing executable code of the program with the obtained trust binary for the program;
    allowing execution of the program in accordance with the confirmed authenticity of the program;
    identifying upcoming execution of an executable function in the program by monitoring execution of the program;
    in response to identifying the upcoming execution of the executable function, obtaining, from the trust binary, a function digest corresponding to the executable function, wherein the function digest comprises a hash of static portions of the executable function, omitting portions of the executable function that require dynamic linking when loaded into memory;
    confirming authenticity of the executable function by comparing executable code of the executable function with the obtained function digest; and
    allowing execution of the executable function in accordance with the confirmed authenticity of the executable function.

18. The computing device of claim 17, wherein the one or more programs further comprise instructions for:
    detecting, via the trust agent, upcoming execution of a second program;
    determining that the trust store does not contain a trust binary corresponding to the second program; and
    initiating a remedial action in accordance with the determination.

19. The computing device of claim 17, wherein the one or more programs further comprise instructions for:
    detecting, via the trust agent, upcoming execution of a second program;
    in response to the detection, obtaining a second trust binary for the second program from the trust store;
    identifying one or more changes in executable code of the second program based on a comparison with the second trust binary; and
    initiating a remedial action in accordance with the identification of the one or more changes.

20. A non-transitory computer-readable storage medium storing one or more programs configured for execution by a computing device having one or more processors, memory, and a display, the one or more programs comprising instructions for:
    executing a trust agent;
    detecting, via the trust agent, upcoming execution of a program on the computing device;
    in response to the detection, obtaining a trust binary for the program from a trust store in the memory;
    confirming authenticity of the program by comparing executable code of the program with the obtained trust binary for the program;
    allowing execution of the program in accordance with the confirmed authenticity of the program;
    identifying upcoming execution of an executable function in the program by monitoring execution of the program;
    in response to identifying the upcoming execution of the executable function, obtaining, from the trust binary, a function digest corresponding to the executable function, wherein the function digest comprises a hash of static portions of the executable function, omitting portions of the executable function that require dynamic linking when loaded into memory;
    confirming authenticity of the executable function by comparing executable code of the executable function with the obtained function digest; and allowing execution of the executable function in accordance with the confirmed authenticity of the executable function.

21. The non-transitory computer-readable storage medium of claim 20, wherein the one or more programs further comprise instructions for:
- while monitoring execution of the program, identifying upcoming execution of a second executable function of the program;
- in response to identifying the upcoming execution of the second executable function, determining that the trust binary does not contain a function digest for the second executable function; and
- initiating a remedial action in accordance with the determination.

* * * * *